US012746661B2

(12) United States Patent
Iwao et al.

(10) Patent No.: US 12,746,661 B2
(45) Date of Patent: Sep. 29, 2026

(54) ROBOT TEACHING SYSTEM AND ROBOT TEACHING METHOD

(71) Applicant: Panasonic Intellectual Property Management Co., Ltd., Osaka (JP)

(72) Inventors: Kazuki Iwao, Hyogo (JP); Hiroyoshi Ueda, Osaka (JP); Naomi Mochimaru, Osaka (JP); Kazuki Hanada, Osaka (JP); Kota Kawamura, Osaka (JP); Mikihisa Suzuki, Kyoto (JP); Miyu Oishi, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 15 days.

(21) Appl. No.: 19/098,300

(22) Filed: Apr. 2, 2025

(65) Prior Publication Data

US 2025/0312912 A1 Oct. 9, 2025

(30) Foreign Application Priority Data

Apr. 5, 2024 (JP) ................................. 2024-061685

(51) Int. Cl.

| | |
|---|---|
| ***B25J 9/00*** | (2006.01) |
| ***B23K 37/02*** | (2006.01) |
| ***B25J 9/16*** | (2006.01) |
| ***G06T 19/00*** | (2011.01) |
| ***G06T 19/20*** | (2011.01) |

(52) U.S. Cl.

CPC ......... *B25J 9/0081* (2013.01); *B23K 37/0229* (2013.01); *B25J 9/1605* (2013.01); *G06T 19/006* (2013.01); *G06T 19/20* (2013.01); *G06T 2200/24* (2013.01); *G06T 2219/2004* (2013.01)

(58) Field of Classification Search

CPC ... G06T 19/006; G06T 19/20; G06T 2200/24; G06T 2219/2004; B25J 9/0081; B25J 9/1605; B25J 9/1664; B25J 9/1671; B23K 37/0229

See application file for complete search history.

(56) References Cited

U.S. PATENT DOCUMENTS

| | | | | |
|---|---|---|---|---|
| 2023/0088582 | A1 | 3/2023 | Uchikata et al. | |
| 2025/0295460 | A1 * | 9/2025 | Brubaker | G06V 10/82 |
| 2025/0295471 | A1 * | 9/2025 | Brubaker | A61B 90/361 |

(Continued)

FOREIGN PATENT DOCUMENTS

| | | |
|---|---|---|
| WO | 2021/251087 | 12/2021 |

*Primary Examiner* — Bhavesh V Amin

(74) *Attorney, Agent, or Firm* — Wenderoth, Lind & Ponack, L.L.P.

(57) ABSTRACT

A robot teaching system stores a three-dimensional model corresponding to at least a part of a robot or a welding torch, or a teaching member, outputs a display image for displaying the three-dimensional model and an operation screen on a display device configured to be mountable to a worker based on the three-dimensional model and operation screen data and displaying an image to be superimposed on an image of an actual environment or the actual environment itself, and generates a display image for displaying the post-change three-dimensional model after changing a posture of the three-dimensional model based on an aerial operation of the worker in the air separated from the display device.

15 Claims, 11 Drawing Sheets

(56) References Cited

U.S. PATENT DOCUMENTS

| | | | | |
|---|---|---|---|---|
| 2025/0312912 | A1* | 10/2025 | Iwao | G06T 19/20 |
| 2025/0339220 | A1* | 11/2025 | Brubaker | A61B 34/10 |
| 2025/0339961 | A1* | 11/2025 | Brubaker | A61B 34/20 |
| 2025/0359950 | A1* | 11/2025 | Brubaker | A61B 34/30 |
| 2025/0359955 | A1* | 11/2025 | Brubaker | A61B 34/20 |
| 2026/0007484 | A1* | 1/2026 | Brubaker | A61B 34/30 |
| 2026/0076760 | A1* | 3/2026 | Brubaker | A61B 34/35 |

* cited by examiner

ROBOT TEACHING SYSTEM AND ROBOT TEACHING METHOD

BACKGROUND

1. Technical Field

The present disclosure relates to a robot teaching system and a robot teaching method.

2. Description of the Related Art

PTL 1 discloses a welding system including a welding robot including a torch and a welding robot control program creation device. A welding system acquires position information of a welding start point and a welding end point of welding to a workpiece and posture information capable of specifying a posture of a torch with respect to a welding line at a welding teaching point on the welding line connecting the welding start point and the welding end point, creates a welding robot control program for performing welding from the welding start point to the welding end point based on the position information and the posture information, and performs welding to the workpiece based on the welding robot control program.

CITATION LIST

Patent Literature

PTL 1: International Publication No. WO 2021/251087

SUMMARY

An object of the present disclosure is to provide a robot teaching system and a robot teaching method of supporting teaching work of a posture of a welding torch at a teaching point in teaching a welding robot operation.

The present disclosure provides a robot teaching system including: a model storage unit that stores a three-dimensional model corresponding to at least a part of a robot existing in an actual environment or a welding torch used for welding, or a teaching member used for teaching of the robot; an operation screen storage unit that stores operation screen data corresponding to an operation screen used for a display operation of the three-dimensional model; a display device that is mountable to a worker and displays an image to be superimposed on an image of an actual environment or the actual environment itself; a positional relationship acquisition unit that acquires a relative positional relationship between the actual environment, the teaching member, and the display device; an image generation unit that generates a display image for displaying the three-dimensional model and the operation screen so as to have a predetermined positional relationship with respect to the display device based on the relative positional relationship, the three-dimensional model and the operation screen data; an output unit that outputs the display image to the display device; and a detection unit that detects an aerial operation that is an operation performed by the worker in an air separated from the display device on the operation screen displayed on the display device. The image generation unit generates the display image for displaying a post-change three-dimensional model in which a posture of the three-dimensional model has been changed based on the aerial operation.

Furthermore, the present disclosure provides a robot teaching system including: a model storage unit that stores a three-dimensional model corresponding to at least a part of a robot existing in an actual environment or a welding torch used for welding, or a teaching member used for teaching of the robot; a display device that is mountable to a worker and displays an image to be superimposed on an image of an actual environment or the actual environment itself; a positional relationship acquisition unit that acquires a relative positional relationship between the actual environment, the teaching member, and the display device; an image generation unit that generates a display image for displaying the three-dimensional model so as to have a predetermined positional relationship with respect to the display device based on the relative positional relationship and the three-dimensional model; an output unit that outputs the display image to the display device; and a detection unit that detects an aerial operation that is an operation performed by a worker in an air separated from the display device on the three-dimensional model displayed on the display device. The image generation unit generates the display image for displaying a post-change three-dimensional model in which a posture of the three-dimensional model has been changed based on the aerial operation.

Furthermore, the present disclosure provides a robot teaching method performed by a system including at least one computer, the method including: storing a three-dimensional model corresponding to at least a part of a robot existing in an actual environment or a welding torch used for welding, or a teaching member used for teaching of the robot, and operation screen data corresponding to an operation screen used for a display operation of the three-dimensional model; acquiring a relative positional relationship with a display device configured to be mountable to the actual environment, the teaching member, and a worker and configured to display an image to be superimposed on an image of an actual environment or the actual environment itself; generating a display image for displaying the three-dimensional model and the operation screen so as to have a predetermined positional relationship with respect to the display device based on the relative positional relationship, the three-dimensional model, and the operation screen data, and displays the display image on the display device; detecting an aerial operation that is an operation performed by the worker in an air separated from the display device on the operation screen displayed on the display device; and generating the display image for displaying a post-change three-dimensional model in which a posture of the three-dimensional model has been changed based on the aerial operation.

Furthermore, the present disclosure provides a robot teaching method performed by a system including at least one computer, the method including: storing a three-dimensional model corresponding to at least a part of a robot existing in an actual environment or a welding torch used for welding, or a teaching member used for teaching of the robot; acquiring a relative positional relationship with a display device configured to be mountable to the actual environment, the teaching member, and a worker and configured to display an image to be superimposed on an image of the actual environment or the actual environment itself; generating a display image for displaying the three-dimensional model so as to have a predetermined positional relationship with respect to the display device based on the relative positional relationship, and the three-dimensional model, and displays the display image on the display device; detecting an aerial operation that is an operation performed by the worker in an air separated from the display device on the three-dimensional model displayed on the display device; and generating the display image for displaying a post-change three-dimensional model in which a posture of the three-dimensional model has been changed based on the aerial operation.

According to the present disclosure, it is possible to support the teaching work of the posture of the welding torch at the teaching point in the teaching of the welding robot operation.

DETAILED DESCRIPTIONS

Background of Present Disclosure

In recent years, as in a welding system described in PTL 1, there is a teaching method in which a position of a teaching point taught by a worker and a posture of a teaching tool at the teaching point are read and taught using an Augmented Reality (AR) device. In this teaching method, the worker directly teaches the teaching point as compared with the case of using a general offline teaching system such as a teaching pendant, and thus the time required for teaching the teaching point can be shortened. However, since the worker wears a head mounted display to perform the teaching work, it may be difficult to teach the teaching point in the posture to be taught based on the worker wearing the head mounted display, the workpiece, and the position or arrangement of the welding robot with respect to the workpiece, or the positional relationship of the teaching point with respect to the workpiece.

Therefore, in the following exemplary embodiment, a robot teaching system and a robot teaching method of supporting the teaching work of the posture of the welding torch at the teaching point in the teaching of the welding robot operation will be described.

Hereinafter, an exemplary embodiment in which a robot teaching system and a robot teaching method according to the present disclosure are specifically disclosed will be described in detail with reference to the drawings as appropriate. It is noted that a more detailed description than need may be omitted. For example, a detailed description of a well-known matter and a repeated description of substantially the same configuration may be omitted. This is to avoid unnecessary redundancy of the following description and to facilitate understanding of those skilled in the art. Note that the appended drawings and the following descriptions are provided for those skilled in the art to fully understand the present disclosure, and are not intended to limit the subject matter set forth in the Claims in any way.

<Overview of Welding System>

Figure 1:
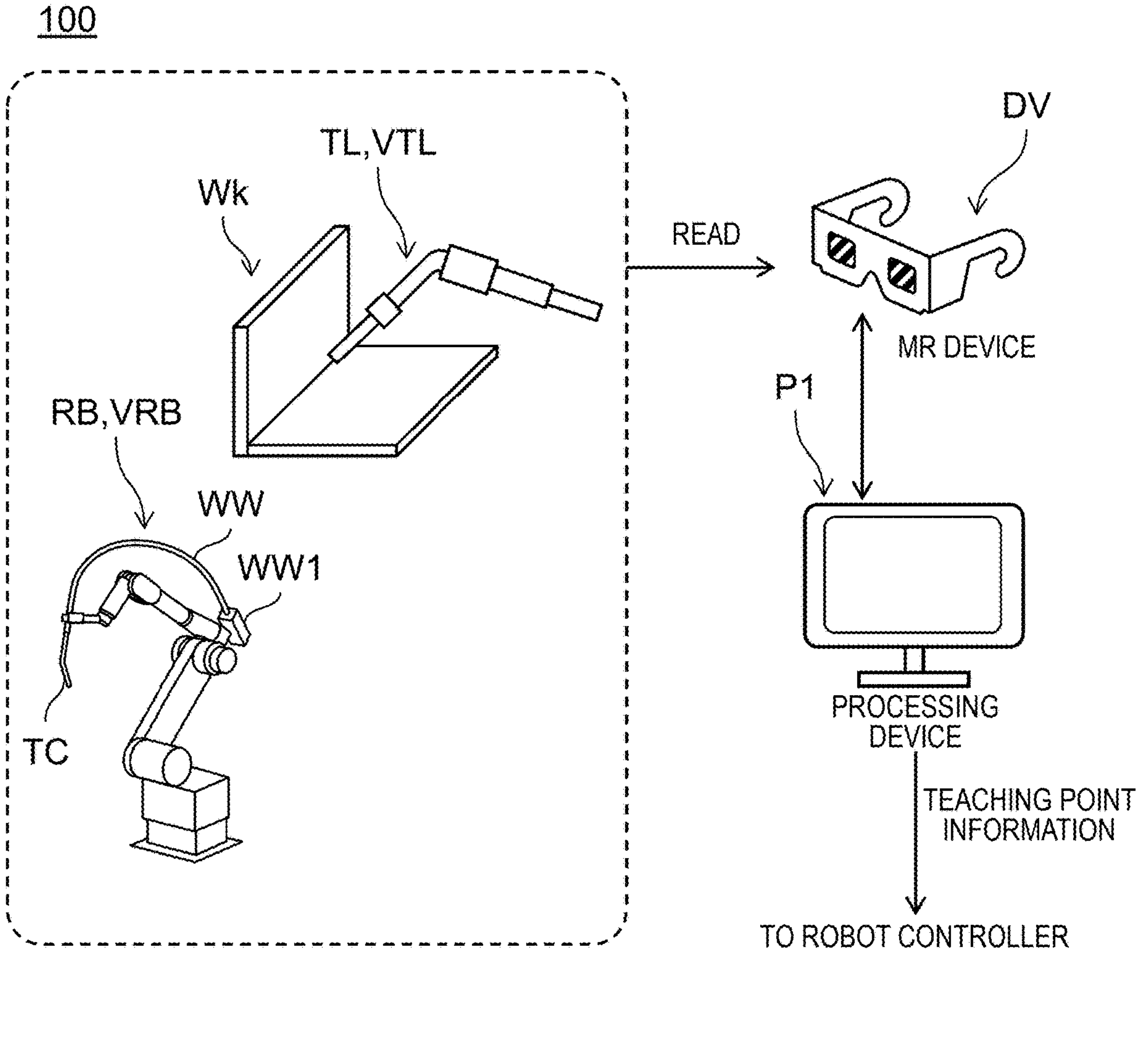
FIG. 1 is a diagram illustrating an example of a welding teaching system according to an exemplary embodiment.

First, welding teaching system 100 according to an exemplary embodiment will be described with reference to FIG. 1. FIG. 1 is a diagram illustrating an example of welding teaching system 100 according to an exemplary embodiment. Note that welding teaching system 100 illustrated in FIG. 1 is an example, and the present disclosure is not limited thereto.

Welding teaching system 100 has the posture of welding torch TC taught on the real world or virtual workpiece Wk in the teaching of the teaching point by the worker, and generates virtual teaching tool VTL resembling welding torch TC. Note that virtual teaching tool VTL in the following description may be replaced with a virtual welding torch.

Welding teaching system 100 generates a mixed reality image in which the generated image of virtual teaching tool VTL is superimposed on the captured image obtained by imaging the real world, visualizes the image to the worker, and accepts an operation of changing the posture of virtual teaching tool VTL appearing in the image. Welding teaching system 100 records the information of the posture changed by the changing operation for each teaching point, and generates a mixed reality image in which the image of virtual teaching tool VTL after the posture change is superimposed to visualize the image to the worker.

In the following description, as an example of the posture, an angle (that is, twist angle) around a TX axis along a direction in which welding wire WW is fed from welding torch TC toward a welding point (that is, the teaching point) on workpiece Wk will be described. However, the changeable posture (angle) is not limited only to the angle (twist angle) around the TX axis. The changeable posture (angle) may be, for example, an angle (that is, the tilt angle) having a direction along the motion trajectory of the tip portion of welding torch TC as a rotation axis, or an angle (that is, the forward-backward angle) orthogonal to the direction along the motion trajectory of the tip portion of welding torch TC and having a direction along the surface of workpiece Wk as a rotation axis.

Furthermore, in the following description, an example in which the workpiece displayed in the mixed reality space is real workpiece Wk existing in the real world will be described, but the workpiece may be a virtual workpiece constructed based on data of a 3D model or the like.

In addition, the teaching point taught in the present disclosure may include not only a welding point at which workpiece Wk is welded, but also an approach point at which welding robot RB (welding torch TC) approaches workpiece Wk, an avoidance point at which welding robot RB (welding torch TC) avoids an obstacle, an idle running point at which welding torch TC is idle, a separation point at which welding robot RB (welding torch TC) moves away from workpiece Wk, or the like.

Welding teaching system 100 includes at least MR device DV. Welding teaching system 100 illustrated in FIG. 1 includes workpiece Wk, teaching tool TL, MR device DV, and processing device P1. Note that workpiece Wk illustrated in FIG. 1 is workpiece Wk in the real world (real object), but workpiece Wk may be a virtual workpiece constructed based on a 3D model of workpiece Wk. In addition, in a case where MR device DV can realize the function of processing device P1, processing device P1 may be omitted.

MR device DV is a so-called head mounted display, and is connected to processing device P1 in a data-communicable manner. MR device DV is mounted on the head of the worker, and forms a virtual space in which an image of a virtual production facility (for example, virtual workpiece, virtual welding robot VRB, a virtual jig, or the like) is superimposed on a captured image obtained by imaging a real space corresponding to the field of view of the worker and displays the virtual space on display unit 13, thereby visualizing the virtual space for the worker.

Further, welding robot RB according to the present disclosure includes welding torch TC and wire feeder WW1, and wire feeder WW1 feeds out welding wire WW from welding torch TC to a welding portion on workpiece Wk for welding. The driving of welding robot RB is controlled by a robot controller (not illustrated) connected to processing device P1 to be described later in a data-communicable manner.

MR device DV generates virtual teaching tool VTL (that is, the virtual welding torch) having the taught posture at the position of the taught teaching point based on information including the position and posture of the taught teaching point (hereinafter, denoted as "teaching information"). MR device DV generates a teaching image in which generated virtual teaching tool VTL is superimposed on the position of the teaching point on workpiece Wk appearing in the captured image captured by camera 15 and displays the teaching image on display unit 13 to visualize the posture of teaching tool TL (that is, the welding torch) at the taught teaching point.

In addition, MR device DV accepts an operation of changing the posture of the teaching tool (welding torch) at the teaching point taught by each method shown in each posture change example described later, that is, the posture included in the teaching information. When accepting the posture changing operation, MR device DV generates and displays a teaching image in which virtual teaching tool VTL (that is, the virtual welding torch) corresponding to the changed posture is superimposed on the captured image. In addition, MR device DV generates teaching information including information of the changed posture and transmits the teaching information to processing device P1.

Processing device P1 is connected between the MR device and the robot controller in a data-communicable manner. Processing device P1 records each piece of taught teaching information (that is, information of the position (three-dimensional) and posture (three-dimensional) of the teaching point). Processing device P1 transmits the teaching information to MR device DV that executes the recorded posture change processing, acquires the teaching information after the change transmitted from MR device DV, and updates (records) the recorded teaching information before the change to the teaching information after the change. Processing device P1 transmits information of the position and posture of the teaching point to the robot controller that controls and drives welding robot RB of a real world, thereby executing the teaching processing of each teaching point.

Figure 2:
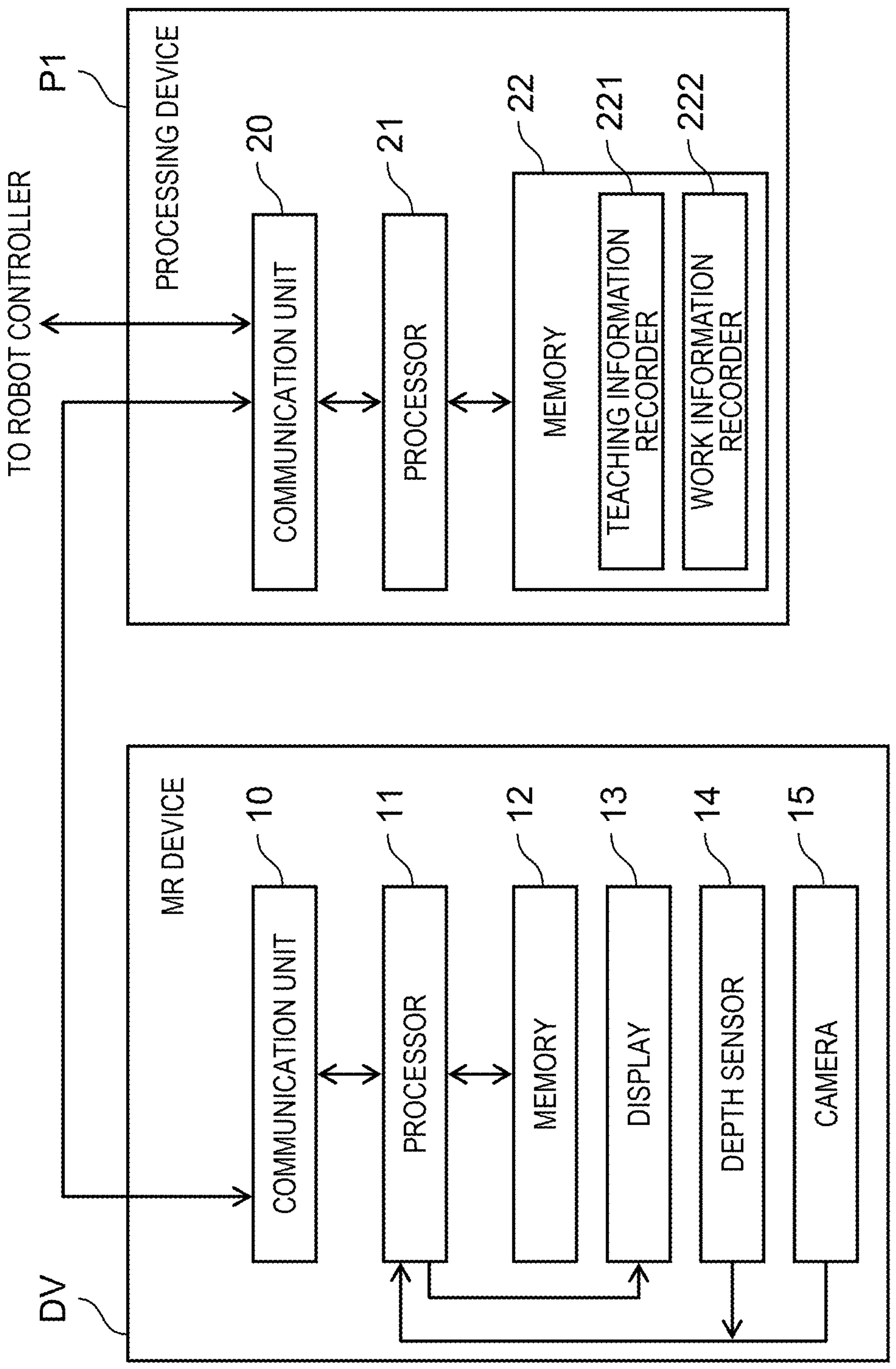
FIG. 2 is a diagram illustrating an internal configuration example of an MR device and a processing device.

Next, an internal configuration example of MR device DV and processing device P1 will be described with reference to FIG. 2. FIG. 2 is a diagram illustrating an internal configuration example of MR device DV and processing device P1.

MR device DV includes communication unit 10, processor 11, memory 12, display unit 13, depth sensor 14, and camera 15.

Communication unit 10 is connected to teaching tool TL and processing device P1 so as to be able to perform wireless communication or wired communication and transmits and receives data. Communication unit 10 outputs various data transmitted from teaching tool TL and processing device P1 to processor 11. Communication unit 10 transmits various data output from processor 11 to processing device P1. The wireless communication mentioned here is communication via a wireless local area network (LAN) such as Wi-Fi (registered trademark). In a case where processing device P1 is omitted in welding teaching system 100, communication unit 10 is connected to the robot controller in a data-communicable manner.

Processor 11 is configured using, for example, a central processing unit (hereinafter, referred to as "CPU") or a field programmable gate array (hereinafter, referred to as "FPGA"), and performs various types of processing and control in cooperation with memory 12. Specifically, processor 11 refers to the program and data stored in memory 12 and executes the program to implement a function of receiving new teaching information, a function of changing taught teaching information, a function of generating a virtual teaching tool corresponding to the teaching information and generating a teaching image, and the like. In a case where processing device P1 is omitted in welding teaching system 100, processor 11 is configured to be able to realize the same function as processor 21 of processing device P1.

Processor 11 calculates a relative positional relationship in the three-dimensional space for each of the recognized or detected object and the production facility based on the object detected by depth sensor 14, the captured image captured by camera 15, and the data of the 3D models of the various production facilities stored in memory 12. Specifically, processor 11 calculates a relative positional relationship in the three-dimensional space for each of the detected or recognized fingers of the worker, teaching tool TL (virtual teaching tool VTL), workpiece Wk (virtual workpiece), welding robot RB (virtual welding robot VRB), marker Mk (virtual marker VMk), and the like. As a result, processor 11 can display the image of the virtual space in which the virtual production facility is superimposed on the captured image of the real world on display unit 13, and can accept a worker's operation (aerial operation) on the displayed image. Thus, processor 11 can generate the teaching information taught to welding robot RB that is welding robot RB of a real world and welds workpiece Wk.

Memory 12 includes, for example, a random access memory (hereinafter, referred to as "RAM") as a work memory used when each processing of processor 11 is executed, and a read only memory (hereinafter, referred to as "ROM") that stores a program and data defining each operation of processor 11. Data or information generated or acquired by processor 11 is temporarily stored in the RAM. A program that defines the operation of processor 11 is written to the ROM.

Memory 12 stores a three-dimensional model of at least a part of welding robot RB or welding torch TC that welds workpiece Wk, a three-dimensional model of teaching tool TL used for teaching welding robot RB, a three-dimensional model of marker Mk used for teaching the posture of welding robot RB, or the like. Memory 12 stores various data generated by processor 11 and displayed on display unit 13.

In addition, memory 12 stores the taught teaching information transmitted from processing device P1 or information of the posture received by any posture change operation described later for each teaching point.

Display unit 13 is configured using, for example, a liquid crystal display (LCD) or organic electroluminescence (EL). Display unit 13 displays an image of the real world itself or a virtual space in which virtual production facilities are superimposed on the real world. Display unit 13 realizes mixed reality by displaying, for example, an image of a virtual space in which virtual production facilities generated by processor 11 are superimposed on a captured image of a real world captured by camera 15 (for example, the teaching image).

Depth sensor 14 is a sensor that measures a distance between MR device DV and a real-world object and recognizes a three-dimensional shape of the real-world object (for example, workpiece Wk, welding robot RB, a jig, or the like). Depth sensor 14 outputs the recognition result to processor 11.

Camera 15 captures an image of an area (real world) corresponding to the field of view of the worker wearing MR device DV. Camera 15 outputs the captured image to processor 11.

Processing device P1 includes communication unit 20, processor 21, and memory 22.

Communication unit 20 is connected to MR device DV and the robot controller so as to be able to perform wireless communication or wired communication and transmits and receives data. Communication unit 20 outputs various data transmitted from MR device DV to processor 21. Communication unit 20 transmits various data output from processor 21 to MR device DV or the robot controller. The wireless communication here is communication via a wireless LAN such as Wi-Fi (registered trademark).

Processor 21 is configured using, for example, a CPU or an FPGA, and performs various types of processing and control in cooperation with memory 22. Specifically, processor 21 refers to programs and data stored in memory 22 and executes the programs to implement various functions for generating a welding teaching program.

Memory 22 includes, for example, a RAM as a work memory used when each processing of processor 21 is executed, and a ROM that stores a program and data that defines each operation of processor 21. Data or information generated or acquired by processor 21 is temporarily stored in the RAM. A program that defines the operation of processor 21 is written to the ROM. Memory 22 includes teaching information recorder 221 and workpiece information recorder 222. Teaching information recorder 221 and workpiece information recorder 222 may be recorded in memory 12 of MR device DV. Memory 22 records a 3D model of the welding robot RB, information regarding a coordinate system of the welding robot, or the like.

Teaching information recorder 221 records each of the plurality of pieces of teaching information for each workpiece Wk. Workpiece information recorder 222 records the 3D model of workpiece Wk.

Figure 3:
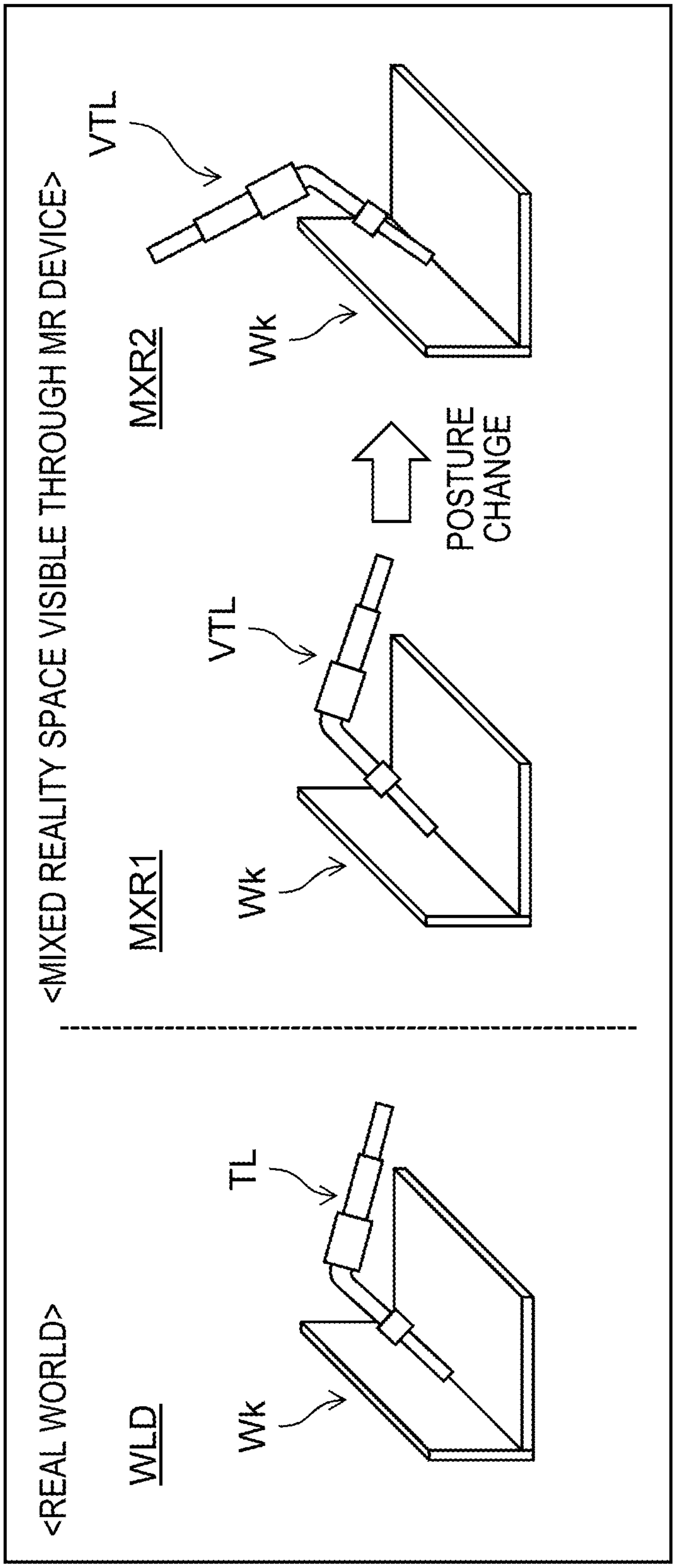
FIG. 3 is a diagram for explaining a difference between teaching work of a teaching point and correction work of a teaching point.

Next, teaching images MXR1, MXR2 displayed on MR device DV in a case where teaching is performed using real workpiece Wk and real teaching tool TL will be described with reference to FIG. 3. FIG. 3 is a diagram for explaining a difference between captured image WLD and teaching images MXR1, MXR2. Note that captured image WLD and teaching images MXR1, MXR2 illustrated in FIG. 3 are examples, and the present disclosure is not limited thereto. For example, workpiece Wk may be a virtual workpiece. Further, teaching tool TL may be a finger of a worker or the like.

Captured image WLD is a real world captured by camera 15. Captured image WLD is an image showing real workpiece Wk and real teaching tool TL. In captured image WLD, teaching tool TL shows a state of teaching the teaching information.

Teaching image MXR1 is an image in which teaching tool TL appearing in captured image WLD of a real world captured by camera 15 is replaced with virtual teaching tool VTL, and shows a state in which teaching tool TL teaches the teaching information.

MR device DV acquires the position and posture of teaching tool TL at the timing when the button included in teaching tool TL is operated by the worker, and generates virtual teaching tool VTL having the acquired posture of teaching tool TL. MR device DV deletes teaching tool TL appearing in captured image WLD, and generates and displays teaching image MXR1 on which virtual teaching tool VTL generated at the position of teaching tool TL on captured image WLD is superimposed instead of teaching tool TL.

Here, MR device DV accepts an operation of changing the posture of teaching tool TL in the teaching information based on the worker's operation. MR device DV acquires information of the posture of teaching tool TL at the timing when the button included in teaching tool TL is operated by the worker as the changed posture. MR device DV generates virtual teaching tool VTL whose posture has been changed based on the teaching information after the posture change. MR device DV deletes virtual teaching tool VTL before the posture change, and generates and displays teaching image MXR2 in which generated virtual teaching tool VTL after the posture change is superimposed on the position of the teaching point based on the teaching information.

Teaching image MXR2 is an image generated after the posture of teaching tool TL taught in captured image WLD is changed. Teaching image MXR2 is an image in which virtual teaching tool VTL after the posture change is superimposed.

As described above, MR device DV in the present disclosure generates and displays teaching image MXR1 in which real-world teaching tool TL is replaced with virtual teaching tool VTL in the mixed reality space. In a case where the posture of the teaching information is changed by the worker's operation, MR device DV generates and displays teaching image MXR2 including virtual teaching tool VTL after the posture change, thereby visualizing the posture of the teaching tool after the posture change to the worker.

Figure 4:
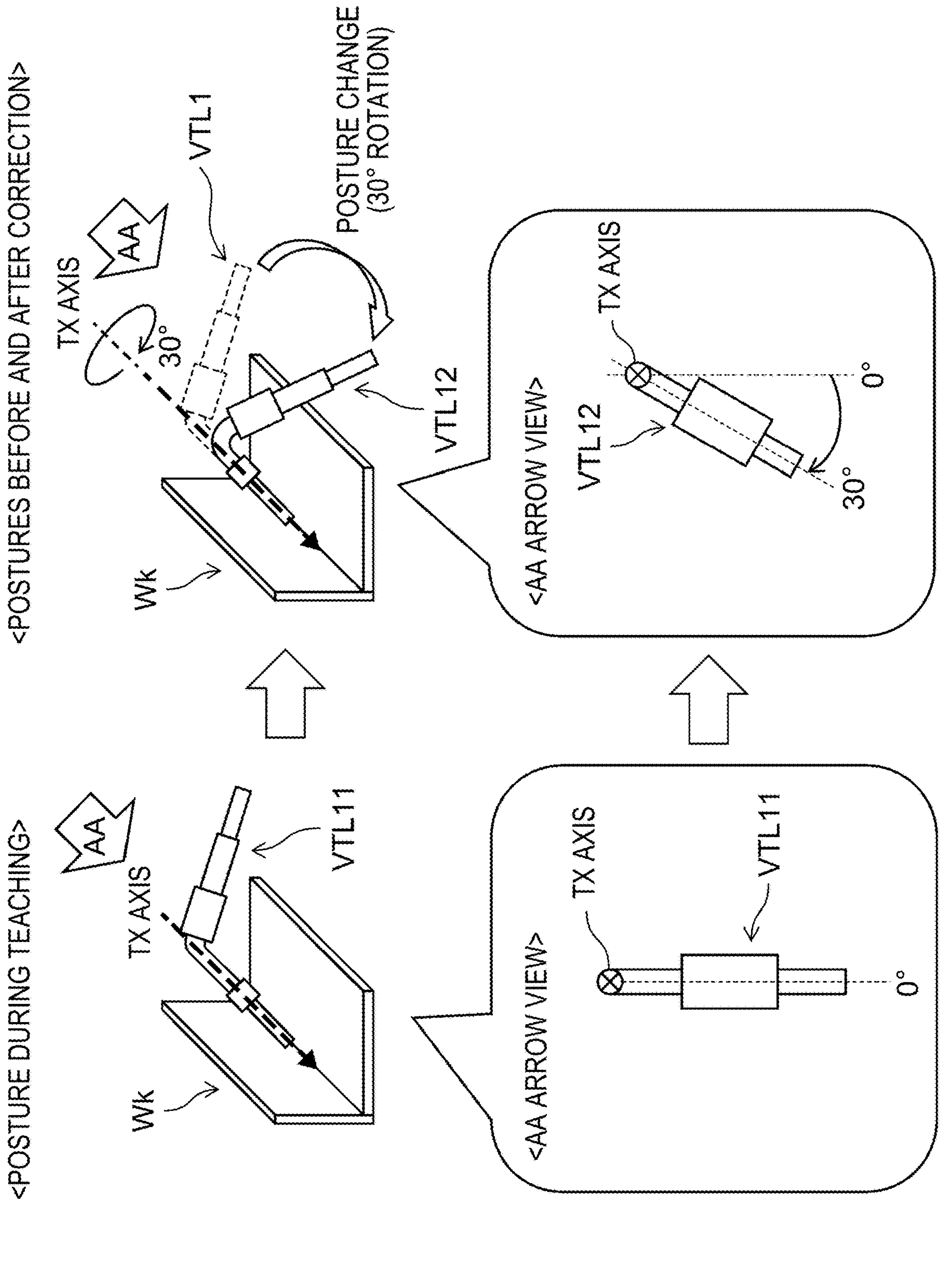
FIG. 4 is a diagram comparing postures of a virtual teaching tool before posture change and a virtual teaching tool after posture change.

Next, the posture changed by the worker's operation will be described with reference to FIG. 4. FIG. 4 is a diagram comparing postures of virtual teaching tool VTL11 before the posture change and virtual teaching tool VTL12 after the posture change.

Virtual teaching tool VTL11 corresponds to the posture of teaching tool TL before the posture change and when teaching information before the posture change is taught. MR device DV calculates a TX axis based on the posture of the teaching information before the posture change, which is the angle of virtual teaching tool VTL11, and sets the calculated TX axis as a reference angle (=0°).

MR device DV accepts an operation of changing the posture of virtual teaching tool VTL about the TX axis by the worker. In the example illustrated in FIG. 4, MR device DV accepts a posture change operation of rotating virtual teaching tool VTL11 by 30° about the TX axis. MR device DV generates virtual teaching tool VTL11 rotated by 30° about the TX axis from the posture (that is, the reference angle) of virtual teaching tool VTL12 after the posture change.

<First Posture Change Operation Example>

Figure 5:
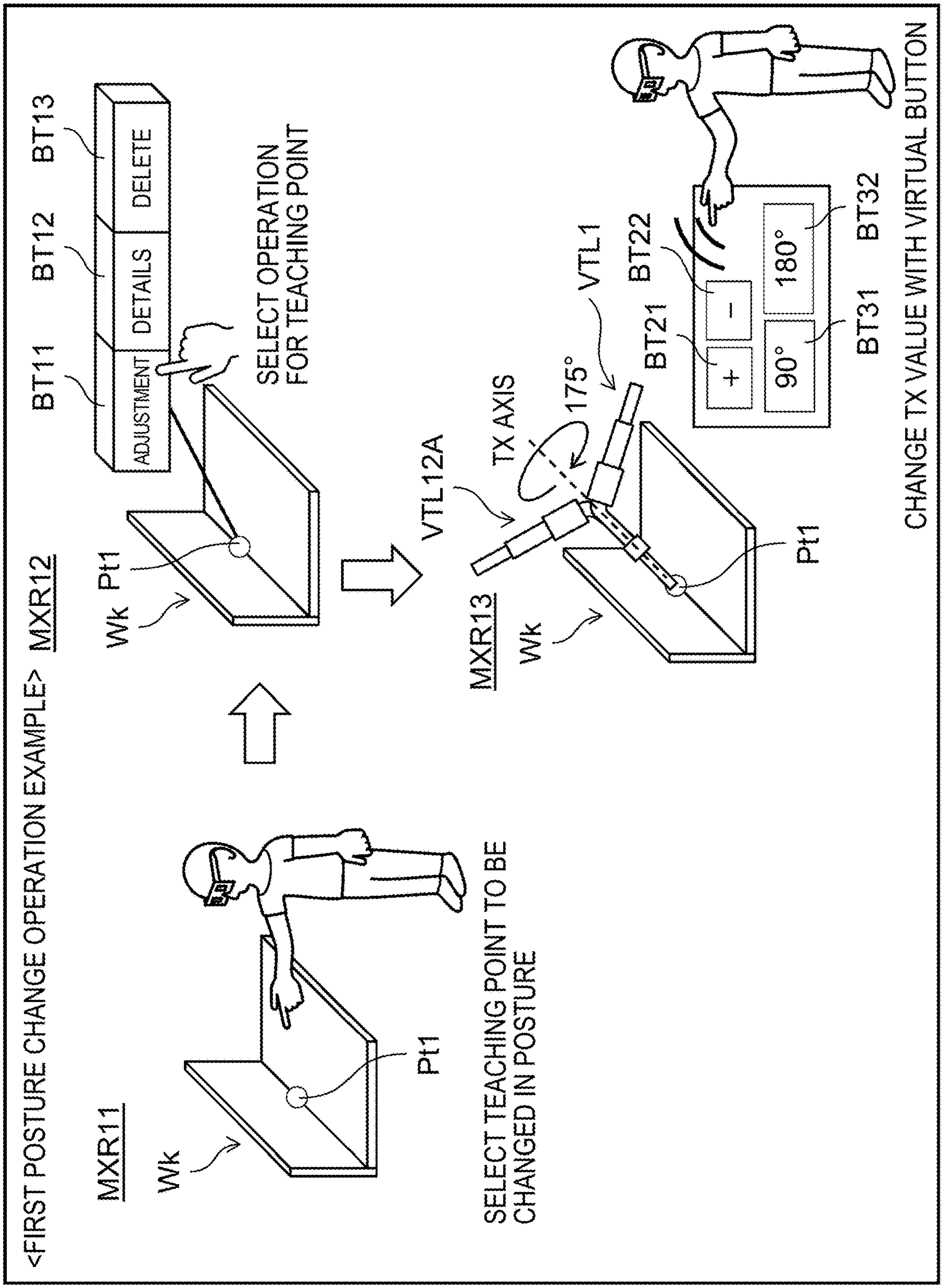
FIG. 5 is a diagram for explaining a first posture change example of the teaching point.

Next, a first posture change operation example of teaching point Pt1 will be described with reference to FIG. 5. FIG. 5 is a diagram for explaining the first posture change operation example of teaching point Pt1. In the example illustrated in FIG. 5, an example in which the teaching point is one point is illustrated, but the present disclosure is not limited thereto.

In workpiece Wk illustrated in FIG. 5, teaching point Pt1 is taught. MR device DV generates teaching point selection image MXR11 in which teaching point Pt1 is superimposed on workpiece Wk based on at least one piece of teaching information (that is, the information of teaching point Pt1) corresponding to workpiece Wk, and displays teaching point selection image MXR11 on display unit 13. The worker selects (presses) teaching point Pt1 on teaching point selection image MXR11.

MR device DV recognizes the position and movement (hereinafter, denoted as "aerial operation") of the finger of the worker in the air based on the captured image captured by camera 15, and generates at least one virtual button indicating the operation content with respect to teaching point Pt1 in a case where it is determined that teaching point Pt1 on teaching point selection image MXR11 is selected. MR device DV generates operation content selection image MXR12 in which a virtual button is further superimposed on teaching point selection image MXR11, and displays operation content selection image MXR12 on display unit 13. The virtual buttons here are adjustment button BT11, detail button BT12, and delete button BT13.

Adjustment button BT11 is a button that accepts adjustment (change) of the posture of selected teaching point Pt1. When adjustment button BT11 is selected (pressed) based on the aerial operation by the worker, MR device DV starts to accept the posture changing operation.

Detail button BT12 is a button for displaying teaching information of selected teaching point Pt1. When detail button BT12 is selected (pressed) by the aerial operation of the worker, MR device DV generates and displays an image further superimposed with the teaching information.

Delete button BT13 is a button for deleting the teaching information of selected teaching point Pt1. When delete button BT13 is selected (pressed) by the aerial operation of the worker, MR device DV deletes teaching point Pt1 from the image displayed on display unit 13, generates a control command for requesting deletion of the teaching information, transmits the control command to processing device P1, and deletes the teaching information of teaching point Pt1.

When adjustment button BT11 is selected (pressed) by the aerial operation of the worker, MR device DV generates virtual teaching tool VTL11 corresponding to the teaching information of selected teaching point Pt1 and each of operation buttons BT21, BT22, BT31, BT32 that accept the operation related to the change of the posture (angle) of virtual teaching tool VTL11. MR device DV generates change operation image MXR13 in which generated virtual teaching tool VTL11 and each of operation buttons BT21, BT22, BT31, BT32 are superimposed on the captured image of a real world and displays change operation image MXR13 on display unit 13.

Operation button BT21 accepts an operation of rotating virtual teaching tool VTL11 by +1° about the TX axis. Operation button BT32 accepts an operation of rotating virtual teaching tool VTL11 by −1° about the TX axis.

Operation button BT31 accepts an operation of rotating virtual teaching tool VTL11 by 90° about the TX axis. Operation button BT32 accepts an operation of rotating virtual teaching tool VTL11 by 180° about the TX axis. The magnitude (here, 90° and 180°) of the angle changed by operation buttons BT31, BT32 is an example, and is not limited thereto.

In a case where MR device DV recognizes that any of operation buttons BT21, BT22, BT31, BT32 is selected by the aerial operation of the worker, MR device DV generates virtual teaching tool VTL12A in which virtual teaching tool VTL11 is rotated by an angle corresponding to the selected operation button. MR device DV displays change operation image MXR13 including virtual teaching tool VTL12A on display unit 13.

Note that change operation image MXR13 illustrated in FIG. 5 illustrates an example in which virtual teaching tool VTL12A obtained by rotating virtual teaching tool VTL11 by 175° about the TX axis by the selection operation of operation buttons BT21, BT22, BT31, BT32 is displayed. In addition, change operation image MXR13 illustrated in FIG. 5 illustrates virtual teaching tool VTL11 before the posture change for easy understanding of description, but the display of virtual teaching tool VTL11 is not essential and may be deleted, or may be displayed with higher transparency than virtual teaching tool VTL12A.

As described above, in the first posture change operation example, MR device DV displays the button (that is, adjustment button BT11, detail button BT12, delete button BT13, and operation buttons BT21, BT22, BT31, BT32) capable of accepting the aerial operation by the worker on each of operation content selection image MXR12 and change operation image MXR13. MR device DV changes the posture (angle) included in the teaching information by recognizing and accepting the worker's operation (aerial operation) on the buttons displayed in operation content selection image MXR12 and change operation image MXR13 by camera 15. The worker can easily change the posture of teaching point Pt1 by operating the operation button displayed on display unit 13 by the mixed reality. As a result, MR device DV can support the posture change work of the teaching information performed by the worker.

<Second Posture Change Operation Example>

Figure 6:
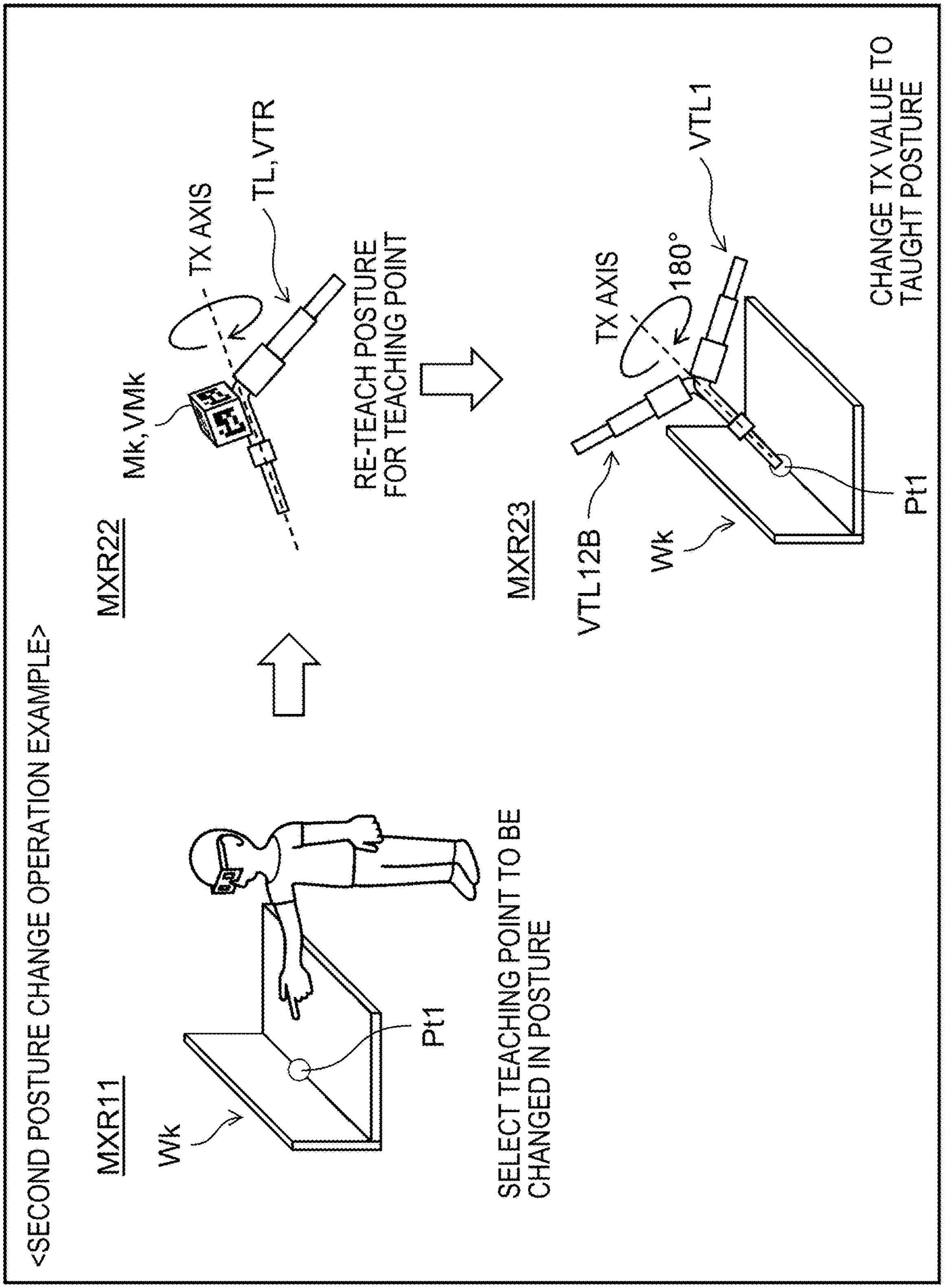
FIG. 6 is a diagram for explaining a second posture change example of the teaching point.

Next, a second posture change operation example of teaching point Pt1 will be described with reference to FIG. 6. FIG. 6 is a diagram for explaining the second posture change operation example of teaching point Pt1. In the example illustrated in FIG. 6, an example in which the teaching point is one point is illustrated, but the present disclosure is not limited thereto. In addition, marker Mk illustrated in FIG. 6 is, for example, a polyhedron having a cubic shape.

In workpiece Wk illustrated in FIG. 6, teaching point Pt1 is taught. MR device DV generates teaching point selection image MXR11 in which teaching point Pt1 is superimposed on workpiece Wk based on at least one piece of teaching information (that is, the information of teaching point Pt1) corresponding to workpiece Wk, and displays teaching point selection image MXR11 on display unit 13. The worker selects (presses) teaching point Pt1 on teaching point selection image MXR11.

MR device DV recognizes the aerial operation performed by the worker based on the captured image captured by camera 15, and generates change operation image MXR22 and displays change operation image MXR22 on display unit 13 in a case where it is determined that teaching point Pt1 on teaching point selection image MXR11 is selected. Change operation image MXR22 is an image that can accept an operation of changing the posture by real-world teaching tool TL or marker Mk gripped by the worker, or an operation of generating virtual teaching tool VTL or virtual marker VMk and changing the posture by the operation on virtual teaching tool VTL or virtual marker VMk.

Note that the setting as to which of real-world teaching tool TL, real-world marker Mk, virtual teaching tool VTL, and virtual marker VMk the change operation is to be performed may be set by a worker. In addition, a plurality of real-world teaching tool TL, real-world marker Mk, virtual teaching tool VTL, and virtual marker VMk, which are tools for accepting the changing operation, may be combined. Based on this setting, MR device DV generates change operation image MXR22 capable of accepting the posture change operation with any one of real-world teaching tool TL, real-world marker Mk, virtual teaching tool VTL, and virtual marker VMk, and displays the change operation image on display unit 13.

For example, MR device DV detects real-world teaching tool TL or real-world marker Mk from the captured image captured by camera 15 in a case where the operation of changing the posture is accepted by real-world teaching tool TL or real-world marker Mk held by the worker. Here, in a case where MR device DV accepts the operation of changing the posture by real-world marker Mk or virtual marker VMk, MR device DV may read a two-dimensional code (for example, a bar code or a QR code (registered trademark)) given to each surface of marker Mk having a cubic shape or virtual marker VMk to acquire the posture of marker Mk or virtual marker VMk. MR device DV generates change operation image MXR22 in which virtual teaching tool VTL or virtual marker VMk corresponding to the posture of the teaching information is superimposed on the real-world captured image in which teaching tool TL or marker Mk appears.

In addition, for example, in a case where MR device DV accepts the posture changing operation by virtual teaching tool VTL or virtual marker VMk, MR device DV generates change operation image MXR22 in which virtual teaching tool VTL or virtual marker VMk corresponding to the posture of the teaching information is superimposed on the real-world captured image. MR device DV calculates the rotation direction and the rotation amount of virtual teaching tool VTL or virtual marker VMk based on the aerial operation of the worker to accept the changing operation of the posture corresponding to the rotation direction and the rotation amount.

MR device DV recognizes the posture of real-world teaching tool TL, real-world marker Mk, virtual teaching tool VTL, or virtual marker VMk changed by the worker based on the captured image captured by camera 15. MR device DV generates virtual teaching tool VTL12B obtained by rotating virtual teaching tool VTL11 corresponding to the posture before the posture change based on the recognized posture after the change. MR device DV displays change operation image MXR23 including virtual teaching tool VTL12B on display unit 13.

Note that change operation image MXR23 illustrated in FIG. 6 illustrates an example in which virtual teaching tool VTL12B obtained by rotating virtual teaching tool VTL11 by 180° about the TX axis based on the posture change operation accepted by change operation image MXR22 is displayed. Change operation image MXR23 illustrated in FIG. 6 illustrates virtual teaching tool VTL11 before the posture change for easy understanding of description, but the display of virtual teaching tool VTL11 is not essential and may be deleted, or may be displayed with higher transparency than virtual teaching tool VTL12B.

As described above, in the second posture change operation example, MR device DV changes the posture (angle) included in the teaching information by accepting the worker's operation using one or more tools of real-world teaching tool TL, real-world marker Mk, virtual teaching tool VTL, or virtual marker VMk in change operation image MXR22. The worker can easily change the posture of teaching point Pt1 by changing the posture of an arbitrary tool in the real world or mixed reality. As a result, MR device DV can support the posture change work of the teaching information performed by the worker.

<Third Posture Change Operation Example>

Figure 7:
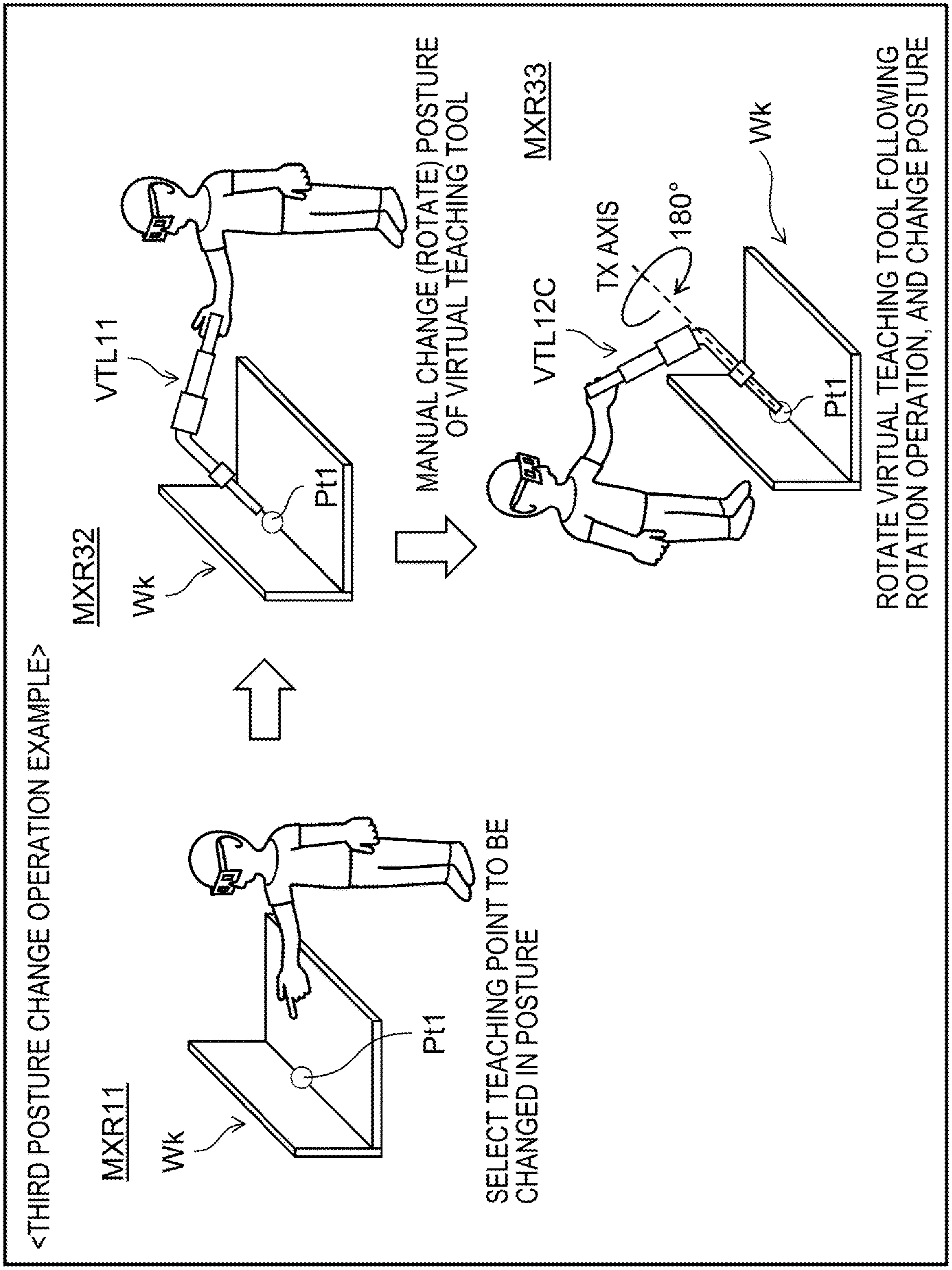
FIG. 7 is a diagram for explaining a third posture change example of the teaching point.

Next, a third posture change operation example of teaching point Pt1 will be described with reference to FIG. 7. FIG. 7 is a diagram for explaining the third posture change operation example of teaching point Pt1. In the example illustrated in FIG. 7, an example in which the teaching point is one point is illustrated, but the present disclosure is not limited thereto.

In workpiece Wk illustrated in FIG. 7, teaching point Pt1 is taught. MR device DV generates teaching point selection image MXR11 in which teaching point Pt1 is superimposed on workpiece Wk based on at least one piece of teaching information (that is, the information of teaching point Pt1) corresponding to workpiece Wk, and displays teaching point selection image MXR11 on display unit 13. The worker performs the aerial operation to select (press) teaching point Pt1 on teaching point selection image MXR11.

In a case where it is determined that teaching point Pt1 on teaching point selection image MXR11 is selected by the aerial operation of the worker based on the captured image captured by camera 15, MR device DV generates change operation image MXR32 and displays change operation image MXR32 on display unit 13. In change operation image MXR32, virtual teaching tool VTL11 having a posture corresponding to the position and posture of teaching point Pt1 is superimposed on the captured image of a real world. Change operation image MXR32 is an image capable of accepting the rotation operation of virtual teaching tool VTL11 about the TX axis by the aerial operation of the worker. Note that virtual teaching tool VTL11 displayed in change operation image MXR32 is superimposed in a state where the tip portion is fixed at the position of teaching point Pt1, and is generated so as to be able to accept only the operation in the rotation direction with the TX axis as the central axis. As a result, MR device DV prevents an unintended operation of changing the position of teaching point Pt1 at the time of the posture change operation.

The worker grips virtual teaching tool VTL11 displayed in change operation image MXR32 in the air and performs an operation of rotating virtual teaching tool VTL11 to have a desired posture. MR device DV rotates virtual teaching tool VTL11 displayed on change operation image MXR32 about the TX axis based on the aerial operation of the worker appearing in the captured image captured by camera 15.

Note that change operation image MXR33 illustrated in FIG. 7 illustrates an example in which virtual teaching tool VTL12B obtained by rotating virtual teaching tool VTL11 by 180° about the TX axis based on the posture change operation accepted by change operation image MXR32 is displayed.

As described above, in the third posture change operation example, MR device DV changes the posture (angle) included in the teaching information by accepting the posture change operation using virtual teaching tool VTL11 in change operation image MXR32. The worker can easily change the posture of teaching point Pt1 by performing the aerial operation of gripping and rotating virtual teaching tool VTL11 in the mixed reality. As a result, MR device DV can support the posture change work of the teaching information performed by the worker.

<Fourth Posture Change Operation Example>

Figure 8:
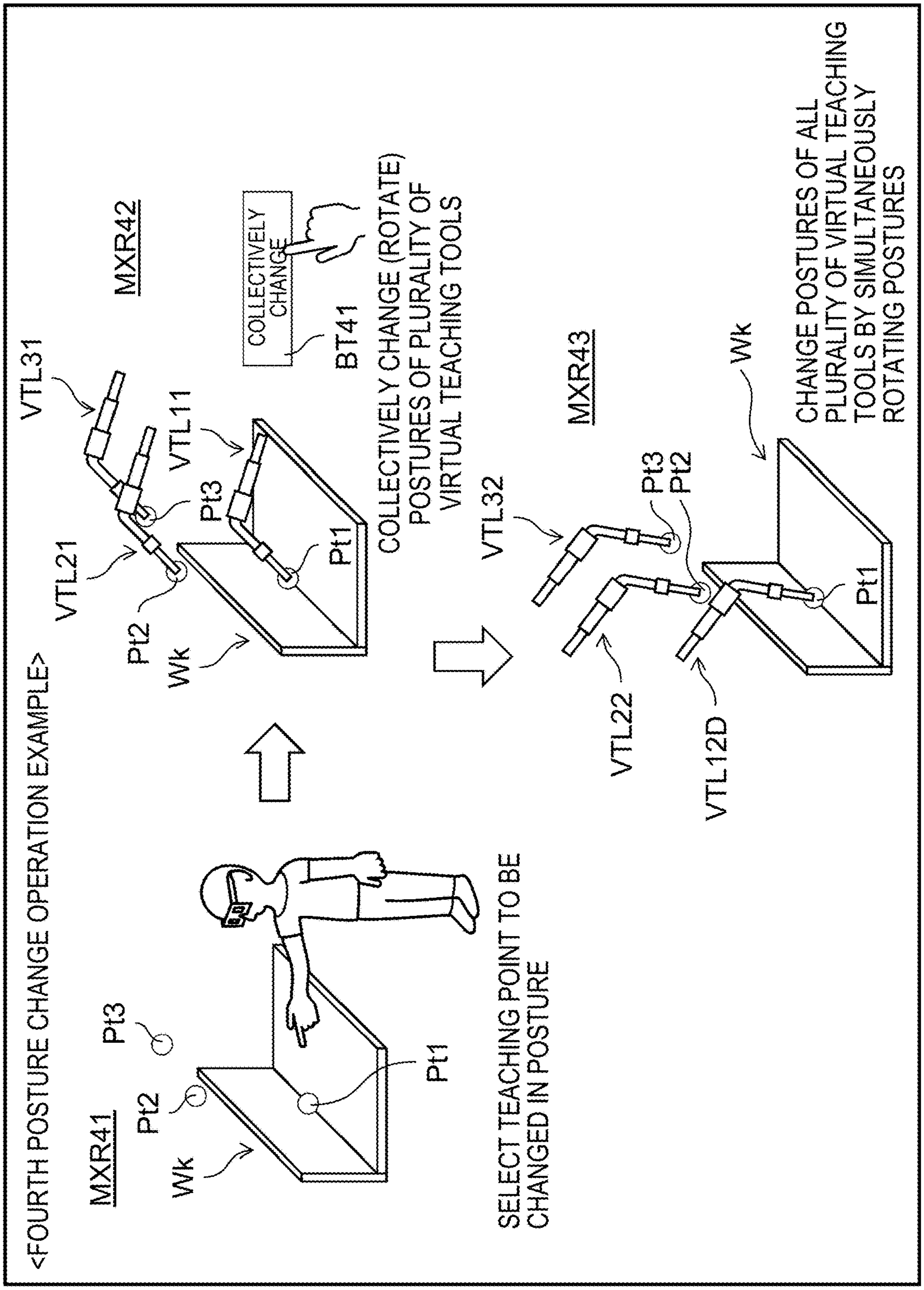
FIG. 8 is a diagram for explaining a fourth posture change example of the teaching point.

Next, a fourth posture change operation example of the plurality of teaching points Pt1 to Pt3 will be described with reference to FIG. 8. FIG. 8 is a diagram for explaining the fourth posture change operation example of teaching points Pt1 to Pt3. In the example illustrated in FIG. 8, an example in which the teaching point is three points is illustrated, but the present disclosure is not limited thereto.

In workpiece Wk illustrated in FIG. 8, three teaching points Pt1, Pt2, Pt3 are taught. MR device DV generates teaching point selection image MXR41 in which each of teaching points Pt1 to Pt3 is superimposed on workpiece Wk based on the teaching information (that is, the information of teaching points Pt1 to Pt3) corresponding to workpiece Wk, and displays teaching point selection image MXR41 on display unit 13. The worker selects (presses) at least one teaching point whose posture is desired to be changed among teaching points Pt1 to Pt3 on teaching point selection image MXR41. In FIG. 8, an example in which three teaching points Pt1 to Pt3 are selected will be described.

MR device DV recognizes the position and movement of the finger of the worker based on the captured image captured by camera 15, and in a case where it is determined that teaching points Pt1 to Pt3 on teaching point selection image MXR11 are selected, generates change operation image MXR42 including change button BT41 that allows the posture corresponding to each of the plurality of selected teaching points Pt1 to Pt3 to be changed collectively, and displays change operation image MXR42 on display unit 13. In a case where change button BT41 is selected (pressed) by the worker's operation, MR device DV generates change operation image MXR42 in which virtual teaching tools VTL11, VTL21, VTL31 in the postures corresponding to the positions and the postures of selected teaching points Pt1 to Pt3 are superimposed on the captured image of a real world and displays change operation image MXR42 on display unit 13.

The worker performs any one of the first to third posture change operation examples described above, and rotates any one of the virtual teaching tools displayed in change operation image MXR42 to have a desired posture. Note that, in FIG. 8, illustration and description of selection processing as to which posture change operation is used to perform the posture change operation are omitted.

MR device DV simultaneously rotates all virtual teaching tools VTL11, VTL21, VTL31 displayed on change operation image MXR42 about the TX axis so as to have the same posture based on the worker's operation.

Note that change operation image MXR43 illustrated in FIG. 8 illustrates an example in which virtual teaching tools VTL12D, VTL22, VTL32 obtained by rotating each of virtual teaching tools VTL11, VTL21, VTL31 by 180° about the X axis based on the posture change operation accepted by change operation image MXR42 are displayed.

As described above, in the fourth posture change operation example, MR device DV changes the posture (angle) included in the plurality of pieces of teaching information by accepting the selection operation of the plurality of teaching points. Since the worker can collectively change the postures of the plurality of pieces of teaching information, the time required for the work of changing the postures of the plurality of teaching points can be further shortened. As a result, MR device DV can support the posture change work of the plurality of pieces of teaching information performed by the worker.

<Fifth Posture Change Operation Example>

Figure 9:
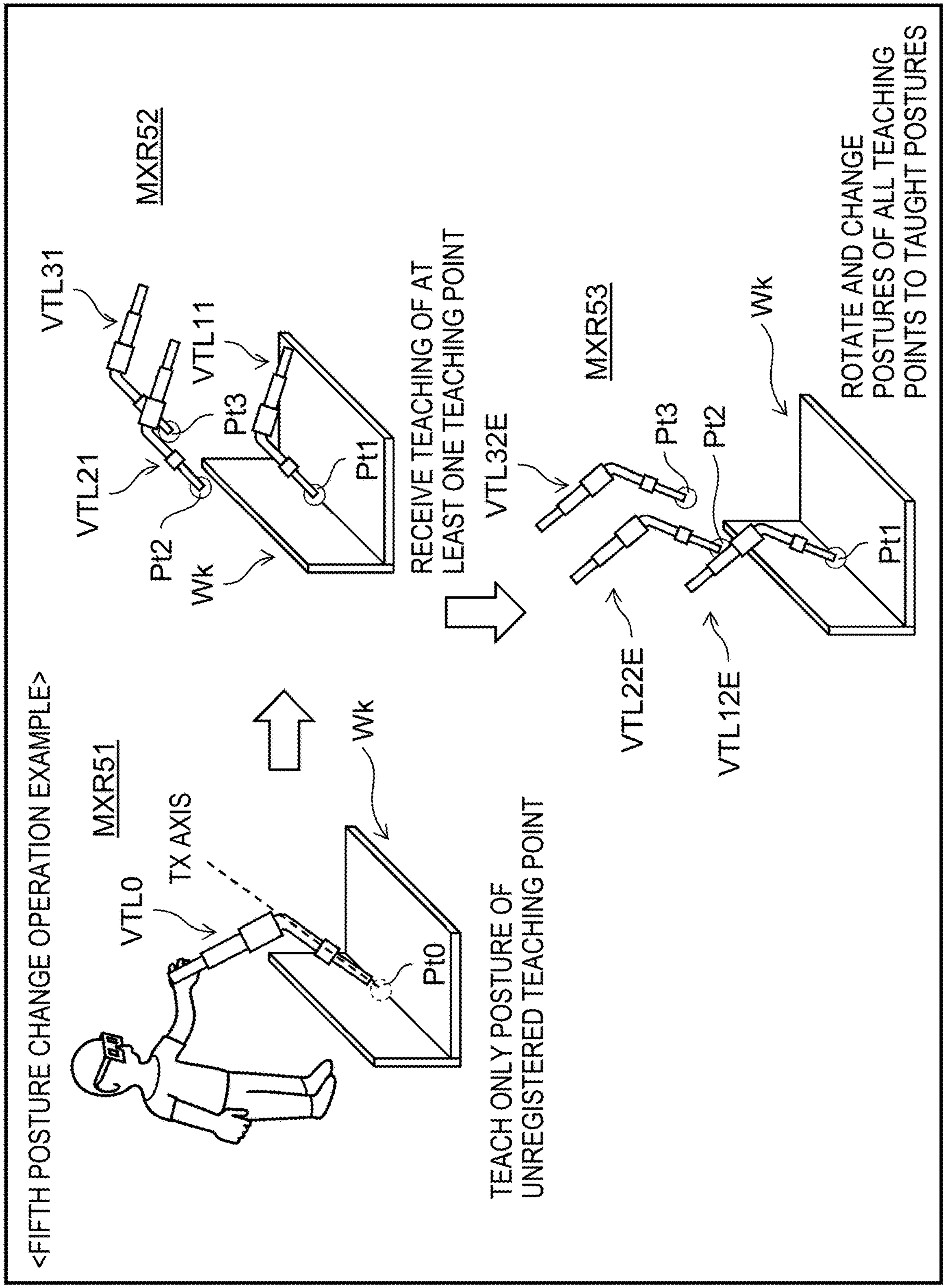
FIG. 9 is a diagram for explaining a fifth posture change example of the teaching point.

Next, a fifth posture change operation example of teaching points Pt1 to Pt3 will be described with reference to FIG. 9. FIG. 9 is a diagram for explaining the fifth posture change operation example of teaching points Pt1 to Pt3. In the example illustrated in FIG. 9, an example in which the teaching point is three points is illustrated, but the present disclosure is not limited thereto.

Workpiece Wk illustrated in FIG. 9 is in a state in which the teaching point (teaching information) to be changed in posture is not registered, that is, is not taught. The worker teaches the posture with respect to virtual teaching point Pt0 by any one posture change operation of the first to third posture change operation examples described above.

MR device DV generates virtual teaching tool VTL0 corresponding to the taught posture. MR device DV generates posture teaching image MXR51 in which virtual teaching tool VTL51 is superimposed on the captured image obtained by imaging real-world workpiece Wk and displays posture teaching image MXR51 on display unit 13. MR device DV records information of the taught posture.

After the teaching of the posture is completed, MR device DV accepts the teaching operation of the position of at least one of teaching points Pt1 to Pt3 by the worker. The teaching of the teaching point may be performed by an arbitrary method. MR device DV generates each of taught teaching points Pt1 to Pt3 and each of virtual teaching tools VTL11, VTL21, VTL31 corresponding to the postures of the teaching tool at the timing when teaching points Pt1 to Pt3 are taught. MR device DV generates teaching image MXR52 in which teaching points Pt1 to Pt3 and each of virtual teaching tools VTL11, VTL21, VTL31 are superimposed on the captured image captured by camera 15, and displays teaching image MXR52 on display unit 13.

MR device DV generates virtual teaching tools VTL12E, VTL22E, VTL32E in which the postures of virtual teaching tools VTL11, VTL21, VTL31 respectively corresponding to teaching points Pt1 to Pt3 are changed to the postures defined by virtual teaching tool VTL0 based on the teaching of the teaching points by the worker.

Here, MR device DV may change the posture of the virtual teaching tool to the posture defined by virtual teaching tool VTL0 every time one teaching point is taught, or may change the posture of the virtual teaching tool corresponding to all the teaching points taught at the timing when it is determined that teaching of all the teaching points is completed to the posture defined by virtual teaching tool VTL0.

MR device DV generates change operation image MXR53 in which teaching points Pt1 to Pt3 and each of virtual teaching tools VTL12E, VTL22E, VTL32E are superimposed on the captured image captured by camera 15, and displays change operation image MXR53 on display unit 13.

As described above, in the fifth posture change operation example, MR device DV can change (set) the posture of at least one teaching point taught to workpiece Wk to the same posture by accepting the teaching operation of teaching only the posture in advance. Since the worker can collectively change (set) the posture of the teaching information to be taught later by one posture teaching, in particular, the time required for the work of changing the posture of the plurality of teaching points can be further shortened. As a result, MR device DV can support the posture change work of the teaching information performed by the worker.

<Operation Procedure of Welding Teaching System>

Figure 10:
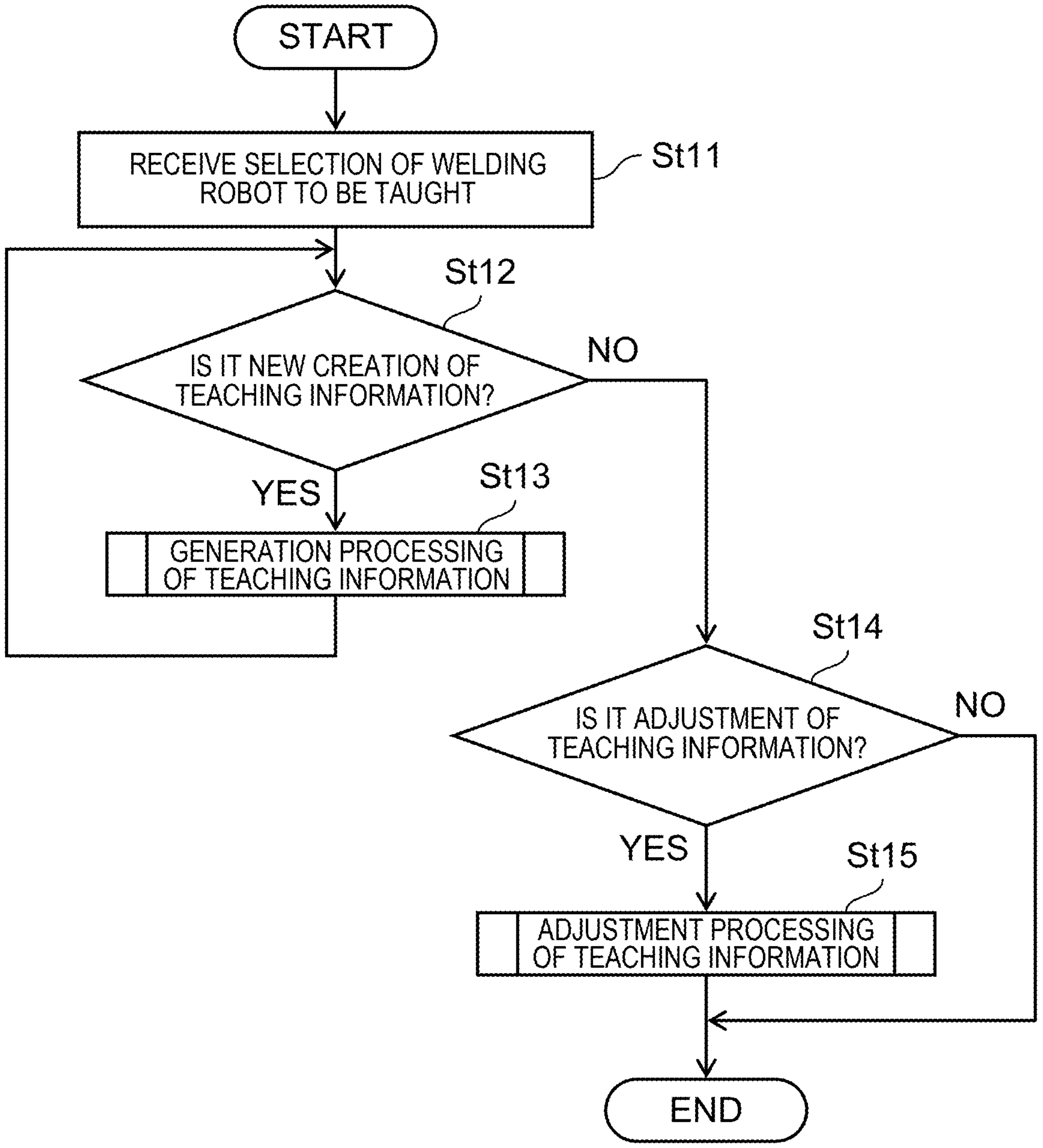
FIG. 10 is a flowchart illustrating an overall motion procedure example of the MR device in the exemplary embodiment.
Figure 11:
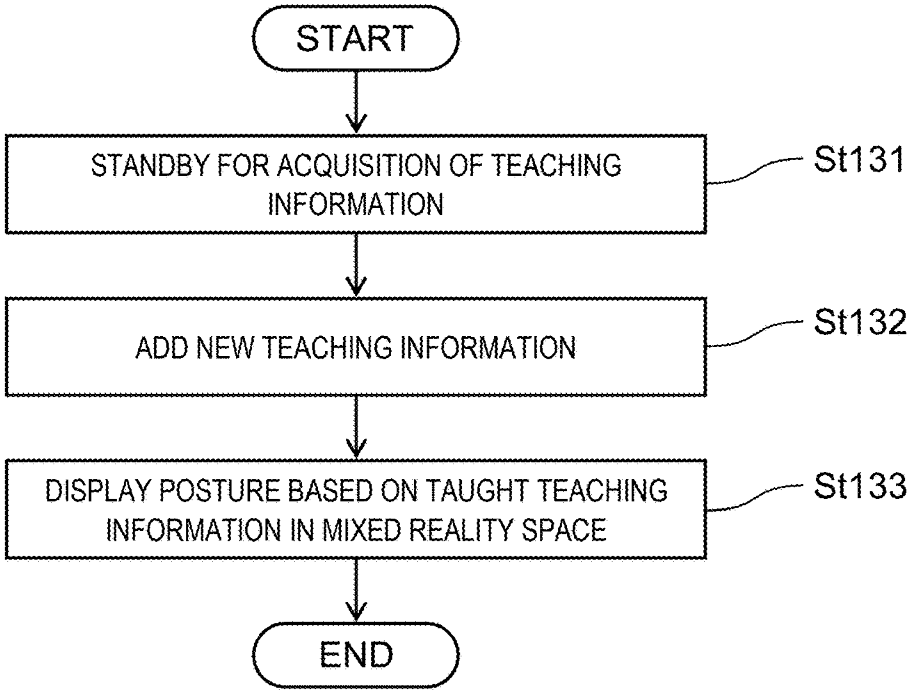
FIG. 11 is a flowchart illustrating an example of a new registration procedure of teaching information of an MR device in the exemplary embodiment.
Figure 12:
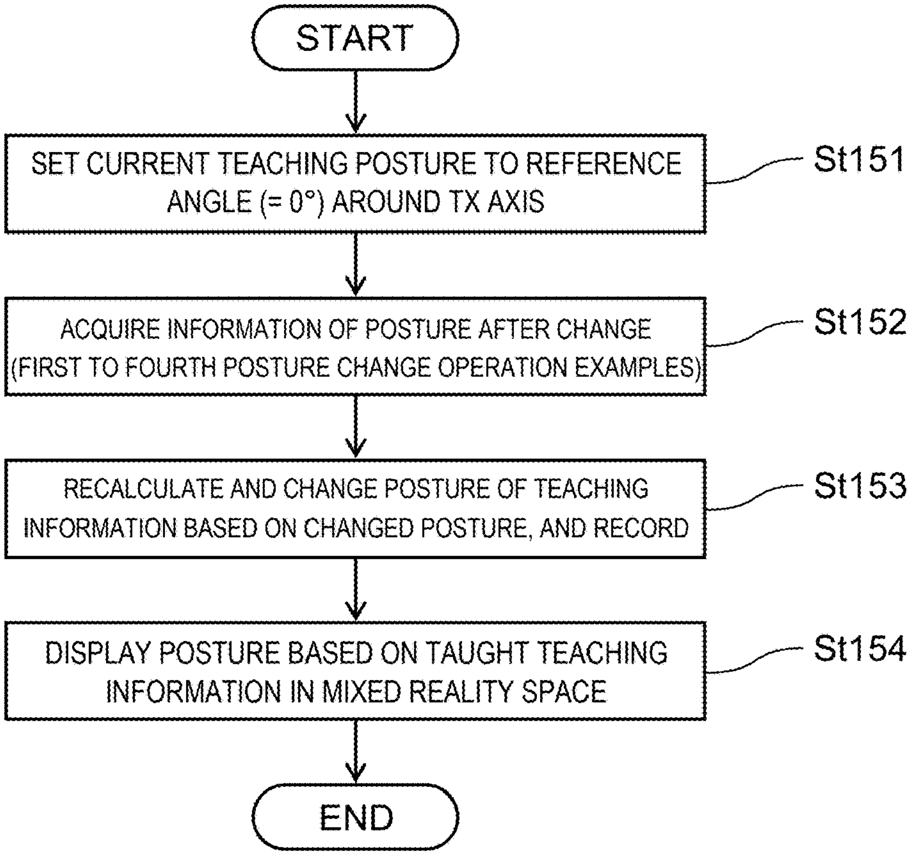
FIG. 12 is a flowchart illustrating an example of a procedure for changing a posture in teaching information of an MR device in the exemplary embodiment.

Next, a motion procedure example of MR device DV in the exemplary embodiment will be described with reference to each of FIGS. 10 to 12. FIG. 10 is a flowchart illustrating an overall motion procedure example of MR device DV in the exemplary embodiment. FIG. 11 is a flowchart illustrating an example of a new registration procedure of teaching information of an MR device DV in the exemplary embodiment. FIG. 12 is a flowchart illustrating an example of a procedure for changing a posture in teaching information of an MR device DV in the exemplary embodiment.

MR device DV accepts a selection operation of welding robot RB to be taught (St11). MR device DV determines whether the teaching work for selected welding robot RB is new creation of teaching information based on the worker's operation (St12). Here, the worker's operation may be accepted by processing device P1 or may be accepted by an image (not illustrated) displayed on display unit 13 of MR device DV.

In a case where it is determined in step St12 that the teaching work for selected welding robot RB is the creation of new teaching information (St12, YES), MR device DV executes the teaching information generation processing (St13).

<Generation Processing of Teaching Information>

Here, a motion procedure example in the teaching information generation processing will be described. The worker wears MR device DV, grips virtual teaching tool VTL, and starts teaching work on workpiece Wk.

MR device DV is in a standby state until a worker's operation of selecting (pressing) a button (not illustrated) included in teaching tool TL or a virtual button (not illustrated) superimposed on the captured image captured by camera 15 and displayed on display unit 13 is executed, that is, until teaching information is acquired (St131).

In a case where a worker's operation of selecting (pressing) a button (not illustrated) included in teaching tool TL or a virtual button (not illustrated) is executed, MR device DV acquires teaching information (that is, information of the position and posture of the teaching point) at the timing of the worker's operation and adds (records) the teaching information as new teaching information corresponding to workpiece Wk (St132).

MR device DV generates virtual teaching tool VTL in the posture corresponding to the taught teaching information, generates teaching image MXR1 (mixed reality space, see FIG. 3) superimposed on the captured image captured by camera 15, and displays teaching image MXR1 on display unit 13 (St133).

In a case where it is determined in step St12 that the teaching work for selected welding robot RB is not the new creation of the teaching information (St12, NO), MR device DV determines whether the teaching work for selected welding robot RB is adjustment of the teaching information based on the worker's operation (St14).

In a case where it is determined in step St14 that the teaching work for selected welding robot RB is adjustment of the teaching information (St14, YES), MR device DV executes adjustment processing of the teaching information (St15).

<Adjustment Processing of Teaching Information>

Here, a motion procedure example in the teaching information adjustment processing will be described. The worker wears MR device DV, grips virtual teaching tool VTL, and starts the adjustment work (posture change work) on workpiece Wk.

MR device DV accepts an operation of selecting at least one teaching point at which teaching information is changed (adjusted) by the worker. MR device DV sets the current teaching posture corresponding to the teaching point to a reference angle (=0°) around the TX axis based on the teaching information of the selected teaching point (St151).

MR device DV accepts a posture change operation according to any one of the first to fourth posture change operation examples and acquires information of the changed posture (St152).

MR device DV recalculates the posture of the teaching information based on the changed posture, and changes and records the information of the posture included in the teaching information (St153).

MR device DV generates virtual teaching tool VTL in the posture corresponding to the changed teaching information, generates teaching image MXR2 (mixed reality space, see FIG. 3) superimposed on the captured image captured by camera 15, and displays teaching image MXR2 on display unit 13 (St154).

In a case where it is determined in step St14 that the teaching work for selected welding robot RB is not adjustment of the teaching information (St14, NO), MR device DV ends the flow illustrated in FIG. 10. MR device DV records the added teaching information or the teaching information whose posture has been changed, or transmits and records the teaching information to processing device P1.

Here, in a case where MR device DV executes the posture change operation according to the fifth posture change operation example, MR device DV may accept the teaching operation of the posture by the method illustrated in FIG. 9 before executing the generation processing of the teaching information in step St13. In such a case, MR device DV automatically executes posture adjustment processing after the generation processing of the teaching information in step St13, and changes (adjusts) the taught posture (see, for example, the posture of virtual teaching tool VTL11, FIG. 9) to the previously taught posture (see, for example, the posture of virtual teaching tool VTL0, FIG. 9) and records the changed posture.

As described above, welding teaching system 100 according to the exemplary embodiment can change (adjust) the posture of at least one teaching point taught to workpiece Wk by the method shown in the first to fifth posture change operation examples. The worker can more easily change (adjust) the posture of the taught or untaught teaching point even if it is difficult to teach the teaching point in the posture to be taught based on the environment in which welding is performed, that is, the position or arrangement of workpiece Wk and welding robot RB with respect to workpiece Wk, the positional relationship of the teaching point with respect to workpiece Wk, and the like. As a result, welding teaching system 100 according to the exemplary embodiment can support the teaching work of the teaching information and the posture change work performed by the worker.

APPENDIX

The following technique is disclosed by the above description of each exemplary embodiment.

(Technology 1)

A robot teaching system (MR device DV) including:

a model storage unit (memory 12) that stores a three-dimensional model corresponding to at least a part of a robot (welding robot RB) existing in an actual environment (that is, the real world) or a welding torch TC used for welding, or a teaching member (teaching tool TL or marker Mk) used for teaching of the robot (welding robot RB);

an operation screen storage unit (memory 12) that stores operation screen data (for example, operation buttons BT21, BT22, BT31, BT32, change button BT41, virtual marker VMk, or the like) corresponding to an operation screen used for a display operation of the three-dimensional model;

a display device (display unit 13) that is mountable to a worker and displays an image to be superimposed on an image of an actual environment or the actual environment itself;

a positional relationship acquisition unit (depth sensor 14 or camera 15) that acquires a relative positional relationship between the actual environment, the teaching member (teaching tool TL or marker Mk), and the display device (display unit 13);

an image generation unit (processor 11) that generates a display image (change operation image MXR13, MXR22) for displaying the three-dimensional model and the operation screen so as to have a predetermined positional relationship with respect to the display device (display unit 13) based on the relative positional relationship and the three-dimensional model and the operation screen data;

an output unit (processor 11) that outputs the display image to the display device (display unit 13); and a detection unit (camera 15) that detects an aerial operation that is an operation performed by the worker in an air separated from the display device (display unit 13) on the operation screen displayed on the display device (display unit 13), in which the image generation unit (processor 11) generates the display image for displaying a post-change three-dimensional model in which the posture of the three-dimensional model has been changed based on the aerial operation.

With this configuration, MR device DV displays change operation images MXR13, MXR22 on display unit 13 by the mixed reality, and can easily change (teach) teaching tool TL at the teaching point, that is, the posture of welding torch TC when welding the teaching point based on the aerial operation of the worker detected by camera 15 and the image displayed on display unit 13. In addition, MR device DV can support the posture change work of the teaching information performed by the worker by displaying virtual teaching tool VTL after the posture change to make it easier to visually recognize whether the posture after the posture change is the posture desired by the worker.

(Technology 2)

The robot teaching system (MR device DV) according to (Technology 1), in which the operation screen is a virtual button (operation buttons BT21, BT22, BT31, BT32) that can be operated by the aerial operation, and in a case where the virtual button (operation buttons BT21, BT22, BT31, BT32) is operated by the aerial operation, the image generation unit (processor 11) generates the display image for displaying the post-change three-dimensional model in which a posture of the three-dimensional model has been changed according to an operation amount of the virtual button.

With this configuration, MR device DV displays change operation images MXR13, MXR22 on display unit 13 by the mixed reality, and can easily change (teach) the posture of teaching tool TL at the teaching point, that is, welding torch TC when welding the teaching point based on the aerial operation of the worker detected by camera 15 and the images of operation buttons BT21, BT22, BT31, BT32 displayed on display unit 13. In addition, MR device DV can support the posture change work of the teaching information performed by the worker by displaying virtual teaching tool VTL after the posture change to make it easier to visually recognize whether the posture after the posture change is the posture desired by the worker.

(Technology 3)

The robot teaching system (MR device DV) according to (Technology 1) or (Technology 2), in which the operation screen is a virtual polyhedron (virtual marker VMk) that can be operated by the aerial operation, and in a case where the virtual polyhedron (virtual marker VMk) is operated by the aerial operation, the image generation unit (processor 11) generates the display image for displaying the post-change three-dimensional model in which a posture of the three-dimensional model has been changed according to an operation amount of the virtual polyhedron (virtual marker VMk).

With this configuration, MR device DV accepts the worker's operation (aerial operation) on virtual marker VMk displayed on display unit 13 by the mixed reality, and can easily change (teach) teaching tool TL at the teaching point, that is, the posture of welding torch TC when welding the teaching point based on the operation amount (that is, the rotation amount) of virtual marker VMk. In addition, MR device DV can support the posture change work of the teaching information performed by the worker by displaying virtual teaching tool VTL after the posture change to make it easier to visually recognize whether the posture after the posture change is the posture desired by the worker.

(Technology 4)

The robot teaching system (MR device DV) according to any one of (Technology 1) to (Technology 3), further including a start detection unit (camera 15) that detects a first start motion (for example, an operation of selecting teaching point Pt1 as a posture change target) in which a predetermined aerial operation performed by the worker is detected by the detection unit (camera 15) or a second start motion in which the teaching member (for example, a real-world or virtual teaching tool, a real-world or virtual marker, or the like) is operated by the worker, in which the image generation unit (processor 11) generates the display image for displaying the operation screen after the first start motion or the second start motion is detected by the start detection unit (camera 15).

With this configuration, MR device DV can generate and output change operation images MXR13, MXR22 capable of accepting the posture change operation in a case where MR device DV detects the worker's operation (aerial operation) on the screen displayed on display unit 13 in the mixed reality. As a result, MR device DV can support the posture change operation performed by the worker.

(Technology 5)

The robot teaching system (MR device DV) according to (Technology 4), in which the positional relationship acquisition unit (depth sensor 14 or camera 15) acquires a position of the teaching member (teaching tool TL or marker Mk) in a case where the first start motion or the second start motion is detected by the start detection unit (camera 15) as a reference position (that is, the reference angle).

With this configuration, MR device DV accepts an operation of changing the twist angle of virtual teaching tool VTL with the posture of virtual teaching tool VTL before the posture change as the rotation center with the posture of virtual teaching tool VTL before the posture change as the reference angle (=0°). As a result, MR device DV can support the posture change operation performed by the worker.

(Technology 6)

The robot teaching system (MR device DV) according to any one of (Technology 1) to (Technology 5), in which the robot (welding robot RB) is a welding robot (welding robot RB) including a wire feeder (WW1) that feeds welding wire WW.

With this configuration, MR device DV can support the teaching of the welding operation performed by the worker in the welding robot that welds workpiece Wk using welding wire WW.

(Technology 7)

The robot teaching system (MR device DV) according to (Technology 6), in which the post-change three-dimensional model has a shape corresponding to the three-dimensional model of the robot (welding robot RB) or the teaching member (teaching tool TL or marker Mk) rotated by a predetermined angle about an axis (TX axis) along a feeding direction of welding wire WW.

With this configuration, MR device DV accepts the teaching of the twist angle of welding torch TC at the time of welding, which is the angle about the TX axis as the rotation center, in the posture of the teaching point, and after the twist angle is changed, displays virtual teaching tool VTL corresponding to the changed twist angle, thereby supporting the posture change operation performed by the worker.

(Technology 8)

The robot teaching system (MR device DV) according to (Technology 7), in which the predetermined angle in the post-change three-dimensional model is determined according to the aerial operation performed by the worker.

With this configuration, MR device DV can accept the posture change operation by the worker without a real tool (real-world teaching tool TL, welding robot RB, or welding torch TC).

(Technology 9)

The robot teaching system (MR device DV) according to any one of (Technology 1) to (Technology 8), further including a teaching information storage unit (memory 12) that stores teaching information including a teaching position taught by the worker and posture information of the three-dimensional model at the teaching position, in which the image generation unit (processor 11) generates the display image that displays a three-dimensional model corresponding to the teaching information and the operation screen, generates post-change teaching information corresponding to the post-change three-dimensional model, and stores the post-change teaching information in the teaching information storage unit (memory 12).

With this configuration, MR device DV can support the posture change operation performed by the worker by changing the posture of the taught teaching point and storing the changed posture.

(Technology 10)

A robot teaching system (MR device DV) including:

a model storage unit (memory 12) that stores a three-dimensional model corresponding to at least a part of a robot (welding robot RB) existing in an actual environment or a welding torch TC used for welding, or a teaching member (teaching tool TL or marker Mk) used for teaching of the robot (welding robot RB);

a display device (display unit 13) that is mountable to a worker and displays an image to be superimposed on an image of an actual environment (that is, the real world) or the actual environment itself;

a positional relationship acquisition unit (depth sensor 14 or camera 15) that acquires a relative positional relationship between the actual environment, the teaching member (teaching tool TL or marker Mk), and the display device (display unit 13);

an image generation unit (processor 11) that generates a display image (change operation image MXR32, MXR42) for displaying the three-dimensional model so as to have a predetermined positional relationship with respect to the display device (display unit 13) based on the relative positional relationship and the three-dimensional model;

an output unit that outputs the display image to the display device (display unit 13); and a detection unit (camera 15) that detects an aerial operation that is an operation performed by a worker in an air separated from the display device (display unit 13) on the three-dimensional model displayed on the display device (display unit 13), in which the image generation unit (processor 11) generates the display image for displaying a post-change three-dimensional model in which the posture of the three-dimensional model has been changed based on the aerial operation.

With this configuration, MR device DV displays change operation images MXR32, MXR42 on display unit 13 by the mixed reality, and can easily change (teach) the posture of teaching tool TL at the teaching point, that is, welding torch TC when welding the teaching point based on the aerial operation of the worker detected by camera 15 and the image of virtual teaching tool VTL displayed on display unit 13. In addition, MR device DV can support the posture change work of the teaching information performed by the worker by displaying virtual teaching tool VTL after the posture change to make it easier to visually recognize whether the posture after the posture change is the posture desired by the worker.

(Technology 11)

The robot teaching system (MR device DV) according to (Technology 10), in which the robot (welding robot RB) is a welding robot (welding robot RB) including wire feeder WW1 that feeds welding wire WW.

(Technology 12)

The robot teaching system (MR device DV) according to (Technology 10) or (Technology 11), in which the post-change three-dimensional model has a shape corresponding to the three-dimensional model of the robot (welding robot RB) or the teaching member (teaching tool TL or marker Mk) rotated by a predetermined angle about an axis along a feeding direction of welding wire WW.

(Technology 13)

The robot teaching system (MR device DV) according to any one of (Technology 10) to (Technology 12), further including a teaching information storage unit (memory 12) that stores teaching information including a teaching position taught by the worker and posture information of the three-dimensional model at the teaching position, in which the image generation unit (processor 11) generates the display image that displays a three-dimensional model corresponding to the teaching information, generates post-change teaching information corresponding to the post-change three-dimensional model, and stores the post-change teaching information in the teaching information storage unit (memory 12).

With this configuration, MR device DV can support the posture change operation performed by the worker by changing the posture of the taught teaching point and storing the changed posture.

(Technology 14)

A robot teaching method performed by a system (MR device DV) including at least one computer (processor 11), the method including:

storing a three-dimensional model corresponding to at least a part of a robot (welding robot RB) existing in an actual environment or a welding torch used for welding, or a teaching member (teaching tool TL or marker Mk) used for teaching of the robot (welding robot RB), and operation screen data (for example, operation buttons BT21, BT22, BT31, BT32, change button BT41, virtual marker VMk, or the like) corresponding to an operation screen used for a display operation of the three-dimensional model;

acquiring a relative positional relationship with a display device (display unit 13) configured to be mountable to the actual environment (that is, the real world), the teaching member (teaching tool TL or marker Mk), and the worker and configured to display an image to be superimposed on an image of the actual environment or the actual environment itself;

generating a display image (change operation image MXR13, MXR22) for displaying the three-dimensional model and the operation screen so as to have a predetermined positional relationship with respect to the display device (display unit 13) based on the relative positional relationship, the three-dimensional model, and the operation screen data, and displays the display image on the display device (display unit 13);

detecting an aerial operation that is an operation performed by the worker in an air separated from the display device (display unit 13) on the operation screen displayed on the display device (display unit 13); and generating the display image for displaying a post-change three-dimensional model in which a posture of the three-dimensional model has been changed based on the aerial operation.

With this configuration, MR device DV that executes the robot teaching method displays change operation images MXR13, MXR22 on display unit 13 by the mixed reality, and can easily change (teach) the posture of teaching tool TL at the teaching point, that is, welding torch TC when welding the teaching point based on the aerial operation of the worker detected by camera 15 and the image displayed on display unit 13. In addition, MR device DV can support the posture change work of the teaching information performed by the worker by displaying virtual teaching tool VTL after the posture change to make it easier to visually recognize whether the posture after the posture change is the posture desired by the worker.

(Technology 15)

A robot teaching method performed by a system (MR device DV) including at least one computer (processor 11), the method including:

storing a three-dimensional model corresponding to at least a part of a robot (welding robot RB) existing in an actual environment (that is, the real world) or a welding torch TC used for welding, or a teaching member (teaching tool TL or marker Mk) used for teaching of the robot (welding robot RB);

acquiring a relative positional relationship with a display device (display unit 13) configured to be mountable to the actual environment, the teaching member (teaching tool TL or marker Mk), and the worker and configured to display an image to be superimposed on an image of the actual environment or the actual environment itself;

generating a display image (change operation image MXR32, MXR42) for displaying the three-dimensional model so as to have a predetermined positional relationship with respect to the display device (display unit 13) based on the relative positional relationship, and the three-dimensional model, and displays the display image on the display device (display unit 13);

detecting an aerial operation that is an operation performed by the worker in an air separated from the display device (display unit 13) on the three-dimensional model displayed on the display device (display unit 13); and generating the display image for displaying a post-change three-dimensional model in which a posture of the three-dimensional model has been changed based on the aerial operation.

With this configuration, MR device DV that executes the robot teaching method displays change operation images MXR32, MXR42 on display unit 13 by the mixed reality, and can easily change (teach) the posture of teaching tool TL at the teaching point, that is, welding torch TC when welding the teaching point based on the aerial operation of the worker detected by camera 15 and the image of virtual teaching tool VTL displayed on display unit 13. In addition, MR device DV can support the posture change work of the teaching information performed by the worker by displaying virtual teaching tool VTL after the posture change to make it easier to visually recognize whether the posture after the posture change is the posture desired by the worker.

Although various exemplary embodiments have been described above with reference to the accompanying drawings, the present disclosure is not limited to such examples. It is apparent that those skilled in the art can conceive various modification examples, correction examples, substitution examples, addition examples, deletion examples, and equivalent examples within the scope described in the attached claims, and those examples are understood to be within the technical scope of the present disclosure. In addition, the constituent elements in the above-described various exemplary embodiments may be arbitrarily combined without departing from the gist of the disclosure.

The present disclosure is useful as a robot teaching system and a robot teaching method of supporting teaching work of a posture of a welding torch at a teaching point in teaching a welding robot operation.

What is claimed is:

1. A robot teaching system comprising:

a model storage unit that stores a three-dimensional model corresponding to at least a part of a robot existing in an actual environment or a welding torch used for welding, or a teaching member used for teaching of the robot;

an operation screen storage unit that stores operation screen data corresponding to an operation screen used for a display operation of the three-dimensional model;

a display device that is mountable to a worker and displays an image to be superimposed on an image of an actual environment or the actual environment itself;

a positional relationship acquisition unit that acquires a relative positional relationship between the actual environment, the teaching member, and the display device;

an image generation unit that generates a display image for displaying the three-dimensional model and the operation screen so as to have a predetermined positional relationship with respect to the display device based on the relative positional relationship, the three-dimensional model and the operation screen data;

an output unit that outputs the display image to the display device; and a detection unit that detects an aerial operation that is an operation performed by the worker in an air separated from the display device on the operation screen displayed on the display device, wherein the image generation unit generates the display image for displaying a post-change three-dimensional model in which a posture of the three-dimensional model has been changed based on the aerial operation.

2. The robot teaching system according to claim 1, wherein the operation screen is a virtual button that can be operated by the aerial operation, and in a case where the virtual button is operated by the aerial operation, the image generation unit generates the display image for displaying the post-change three-dimensional model in which a posture of the three-dimensional model has been changed according to an operation amount of the virtual button.

3. The robot teaching system according to claim 1, wherein the operation screen is a virtual polyhedron that can be operated by the aerial operation, and in a case where the virtual polyhedron is operated by the aerial operation, the image generation unit generates the display image for displaying the post-change three-dimensional model in which a posture of the three-dimensional model has been changed according to an operation amount of the virtual polyhedron.

4. The robot teaching system according to claim 1, further comprising a start detection unit that detects a first start motion in which a predetermined aerial operation performed by the worker is detected by the detection unit or a second start motion in which the teaching member is operated by the worker, wherein the image generation unit generates the display image for displaying the operation screen after the first start motion or the second start motion is detected by the start detection unit.

5. The robot teaching system according to claim 4, wherein the positional relationship acquisition unit acquires a position of the teaching member in a case where the first start motion or the second start motion is detected by the start detection unit as a reference position.

6. The robot teaching system according to claim 1, wherein the robot is a welding robot including a wire feeder that feeds a welding wire.

7. The robot teaching system according to claim 6, wherein the post-change three-dimensional model has a shape corresponding to the three-dimensional model of the robot or the teaching member rotated by a predetermined angle about an axis along a feeding direction of the welding wire.

8. The robot teaching system according to claim 7, wherein the predetermined angle in the post-change three-dimensional model is determined according to the aerial operation performed by the worker.

9. The robot teaching system according to claim 1, further comprising a teaching information storage unit that stores teaching information including information of a teaching position of the welding and posture information of the three-dimensional model at the teaching position, wherein the image generation unit generates the display image that displays a three-dimensional model corresponding to the teaching information and the operation screen, generates post-change teaching information corresponding to the post-change three-dimensional model, and stores the post-change teaching information in the teaching information storage unit.

10. A robot teaching system comprising:

a model storage unit that stores a three-dimensional model corresponding to at least a part of a robot existing in an actual environment or a welding torch used for welding, or a teaching member used for teaching of the robot;

a display device that is mountable to a worker and displays an image to be superimposed on an image of an actual environment or the actual environment itself;

a positional relationship acquisition unit that acquires a relative positional relationship between the actual environment, the teaching member, and the display device;

an image generation unit that generates a display image for displaying the three-dimensional model so as to have a predetermined positional relationship with respect to the display device based on the relative positional relationship and the three-dimensional model;

an output unit that outputs the display image to the display device; and a detection unit that detects an aerial operation that is an operation performed by a worker in an air separated from the display device on the three-dimensional model displayed on the display device, wherein the image generation unit generates the display image for displaying a post-change three-dimensional model in which a posture of the three-dimensional model has been changed based on the aerial operation.

11. The robot teaching system according to claim 10, wherein the robot is a welding robot including a wire feeder that feeds a welding wire.

12. The robot teaching system according to claim 11, wherein the post-change three-dimensional model has a shape corresponding to the three-dimensional model of the robot or the teaching member rotated by a predetermined angle about an axis along a feeding direction of the welding wire.

13. The robot teaching system according to claim 10, further comprising a teaching information storage unit that stores teaching information including a teaching position taught by the worker and posture information of the three-dimensional model at the teaching position, wherein the image generation unit generates the display image that displays a three-dimensional model corresponding to the teaching information, generates post-change teaching information corresponding to the post-change three-dimensional model, and stores the post-change teaching information in the teaching information storage unit.

14. A robot teaching method performed by a system including at least one computer, the method comprising:

storing a three-dimensional model corresponding to at least a part of a robot existing in an actual environment or a welding torch used for welding, or a teaching member used for teaching of the robot, and operation screen data corresponding to an operation screen used for a display operation of the three-dimensional model;

acquiring a relative positional relationship with a display device configured to be mountable to the actual environment, the teaching member, and a worker and configured to display an image to be superimposed on an image of the actual environment or the actual environment itself;

generating a display image for displaying the three-dimensional model and the operation screen so as to have a predetermined positional relationship with respect to the display device based on the relative positional relationship, the three-dimensional model, and the operation screen data, and displays the display image on the display device;

detecting an aerial operation that is an operation performed by the worker in an air separated from the display device on the operation screen displayed on the display device; and generating the display image for displaying a post-change three-dimensional model in which a posture of the three-dimensional model has been changed based on the aerial operation.

15. A robot teaching method performed by a system including at least one computer, the method comprising:

storing a three-dimensional model corresponding to at least a part of a robot existing in an actual environment or a welding torch used for welding, or a teaching member used for teaching of the robot;

acquiring a relative positional relationship with a display device configured to be mountable to the actual environment, the teaching member, and a worker and configured to display an image to be superimposed on an image of the actual environment or the actual environment itself;

generating a display image for displaying the three-dimensional model so as to have a predetermined positional relationship with respect to the display device based on the relative positional relationship, and the three-dimensional model, and displays the display image on the display device;

detecting an aerial operation that is an operation performed by the worker in an air separated from the display device on the three-dimensional model displayed on the display device; and generating the display image for displaying a post-change three-dimensional model in which a posture of the three-dimensional model has been changed based on the aerial operation.

* * * * *